(12) United States Patent
Yang et al.

(10) Patent No.: US 8,483,333 B2
(45) Date of Patent: Jul. 9, 2013

(54) METHODS FOR ADJUSTING SYSTEM CLOCK IN TERMS OF OPERATIONAL STATUS OF NON-BASEBAND MODULE, METHODS FOR PERIPHERAL DEVICE CONTROL ADJUSTMENT, AND ELECTRONIC DEVICES USING THE SAME

(75) Inventors: Ming-Jie Yang, Tainan County (TW); Chieh-Chuan Chin, Sabah (MY); Chien-Sheng Lai, Changhua County (TW); Po-Sen Tseng, Hsinchu County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 319 days.

(21) Appl. No.: 12/959,392

(22) Filed: Dec. 3, 2010

(65) Prior Publication Data

US 2011/0274221 A1 Nov. 10, 2011

Related U.S. Application Data

(60) Provisional application No. 61/331,860, filed on May 6, 2010.

(51) Int. Cl.
*H04L 27/06* (2006.01)
(52) U.S. Cl.
USPC ........... 375/344; 375/238; 375/239; 375/242; 375/256; 375/257; 375/353

(58) Field of Classification Search
USPC ................ 375/344, 238, 239, 342, 256, 257, 375/286, 353; 370/203, 204, 205, 206, 207, 370/208, 209, 210; 455/130
See application file for complete search history.

(56) References Cited

U.S. PATENT DOCUMENTS

| | | | |
|---|---|---|---|
| 8,265,563 B2 * | 9/2012 | Beninghaus et al. | 455/63.1 |
| 2007/0153010 A1 * | 7/2007 | Uhlik | 345/501 |
| 2009/0138745 A1 | 5/2009 | Dorsey | |
| 2009/0279602 A1 * | 11/2009 | Wang | 375/240.02 |
| 2012/0042193 A1 * | 2/2012 | Gupta et al. | 713/501 |

FOREIGN PATENT DOCUMENTS

EP 0 803 997 A2 10/1997

* cited by examiner

*Primary Examiner* — Dhaval Patel
(74) *Attorney, Agent, or Firm* — Winston Hsu; Scott Margo

(57) ABSTRACT

A method for adjusting a system clock in terms of an operational status of at least one non-baseband module includes: getting first information corresponding to the system clock required by at least one baseband module, wherein the first information comprises a frequency characteristic of the system clock; getting second information corresponding to the at least one non-baseband module, wherein the second information comprises a frequency characteristic of a radio frequency (RF) signal to be received by the non-baseband module; and selectively adjusting a frequency of the system clock by referring to the first information and the second information.

13 Claims, 19 Drawing Sheets

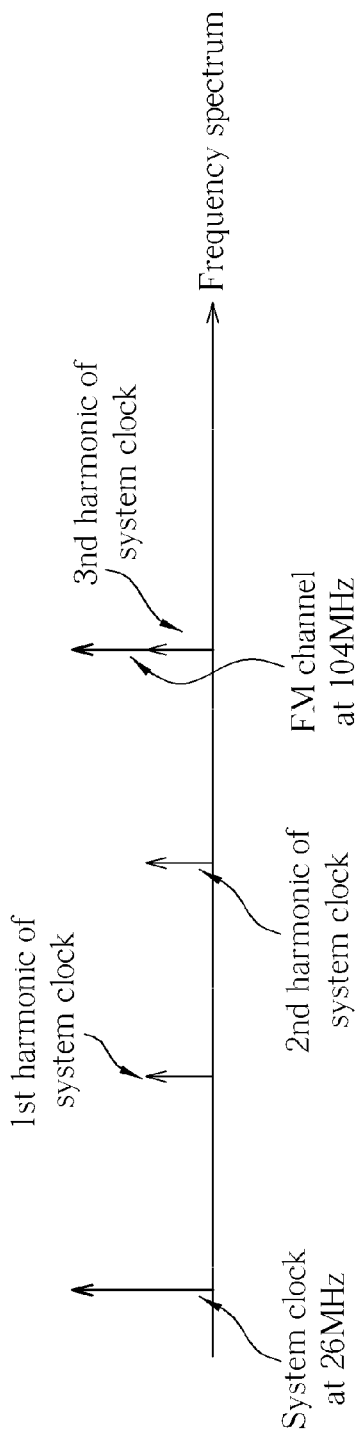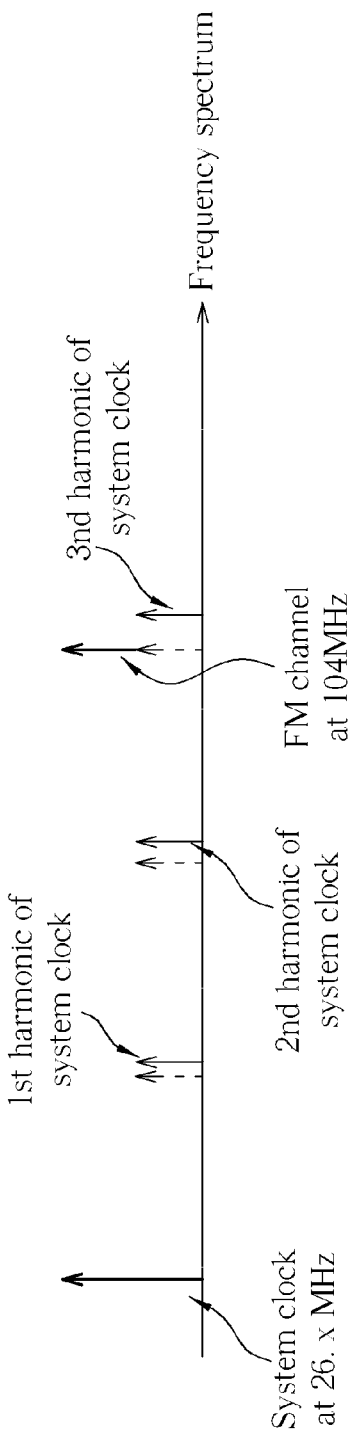
FIG. 3A
FIG. 3B

METHODS FOR ADJUSTING SYSTEM CLOCK IN TERMS OF OPERATIONAL STATUS OF NON-BASEBAND MODULE, METHODS FOR PERIPHERAL DEVICE CONTROL ADJUSTMENT, AND ELECTRONIC DEVICES USING THE SAME

CROSS REFERENCE TO RELATED APPLICATIONS

This application claims the benefit of U.S. Provisional Application No. 61/331,860 filed on May 6, 2010 and entitled "Methods for system clock adjustment in terms of receiver (Rx) frequency and system using the same", the entire contents of which are hereby incorporated by reference.

BACKGROUND OF THE INVENTION

1. Field of the Invention

The present invention relates to avoidance of receiver desensitization, and more particularly, to methods for ensuring the sensitivity of an RF receiver module within an electronic device by avoiding the interference caused by other circuits of the electronic device, and the electronic devices using the same.

2. Description of the Related Art

Taking a Global System for Mobile Communications/General Packet Radio Service (GSM/GPRS) chip as an example, essential electronic components, such as digital base-band (DBB) circuits, analog base-band (ABB) circuits, a power management unit (PMU) and a radio frequency (RF) transceiver are integrated into a single chip (System on Chip, SOC). In addition, the GSM/GPRS chip may have peripheral supports such as a digital camera, a high speed Universal Serial Bus (USB) and a class D audio amplifier (AMP).

Conventionally, the RF receiver and the baseband circuits are implemented on individual chips, and the interference of the baseband circuits with the RF receiver may be reduced by using shielding room. Once the baseband circuits and the RF receiver are integrated into a SOC, however, problems of interference from the baseband circuits to the RF receiver may occur. Sometimes the interference may originate from the coupling of high frequency harmonics of the system clock, receiver (Rx) input pads, VCO (voltage-controlled oscillator) Vtune signals and so on, where a harmonic of a wave is a component frequency of the signal that is an integer multiple of the fundamental frequency: for example, if the fundamental frequency is f, the harmonics have frequencies 2f, 3f, 4f, and so on. Sometimes the interference couples into the RF receiver, and thereby causes RF de-sensitization. The noises may hit the channel (e.g., a GSM channel) and degrade the Rx performance. Assuming that the Rx sensitivity is −109 dBm and the SNR is 6 dB, the Rx noise level has to be less than −115 dBm. If the clock source is a 1V 26 MHz square-wave, its 35th harmonic (936 MHz) is −18.7 dBm. As a result, 100 dB attenuation is required to isolate the interference from coupling to the RF circuits.

Therefore, a method and a system for diminishing interference of the RF circuits of an SOC by digital parts of the SOC and for lessening the RF de-sensitization phenomenon is required.

BRIEF SUMMARY OF THE INVENTION

It is therefore an objective of the claimed invention to provide methods for diminishing the interference of the RF receiver module from digital circuits integrated into a system on chip (SOC) and thereby ensuring the RF sensitivity, and electronic devices thereof.

According to a first exemplary embodiment of the present invention, a method for adjusting a system clock in terms of an operational status of at least one non-baseband module is provided. The method comprises the following steps: getting first information corresponding to the system clock required by at least one baseband module, wherein the first information comprises a frequency characteristic of the system clock; getting second information corresponding to the at least one non-baseband module, wherein the second information comprises a frequency characteristic of a radio frequency (RF) signal to be received by the non-baseband module; and selectively adjusting a frequency of the system clock by referring to the first information and the second information.

According to a second exemplary embodiment of the present invention, an electronic device for adjusting a system clock in terms of an operational status of at least one non-baseband module is provided. The electronic device comprises: at least one baseband module; at least one non-baseband module; and a control module. The at least one baseband module receives the system clock. The control module gets first information corresponding to the system clock and second information corresponding to the at least one non-baseband module, and selectively adjusting a frequency of the system clock by referring to the first information and the second information; wherein the first information comprises a frequency characteristic of the system clock, and the second information comprises a frequency characteristic of an radio frequency (RF) signal to be received by the non-baseband module.

According to a third exemplary embodiment of the present invention, a method for peripheral device control adjustment is provided. The method comprises the following steps: selectively disabling a control to a peripheral device during each receiving timeslot; wherein the receiving timeslot is used for receiving radio frequency (RF) signals.

According to a fourth exemplary embodiment of the present invention, an electronic device for peripheral device control adjustment is provided. The electronic device comprises: a peripheral device, a radio frequency (RF) receiver module, and a processing unit. The RF receiver module receives RF signals during each receiving timeslot; and the processing unit selectively disables a control to the peripheral device during the each receiving timeslot.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The invention can be more fully understood by reading the subsequent detailed description and examples with references made to the accompanying drawings, wherein:

FIG. 3A is an exemplary case wherein the non-baseband module in FIG. 1 is an FM receiver module, and the FM receiving channel is interfered with by the harmonics of a 26 MHz system clock.

FIG. 3B is an exemplary case of the present invention which selectively adjusts the system clock and thereby ensures the sensitivity of the currently used receiving channel/receiving channel to be used when the non-baseband module (e.g., RF receiver module) complies with the FM standard.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " Also, the term "couple" is intended to mean either an indirect or direct electrical connection. Accordingly, if one device is coupled to another device, that connection may be through a direct electrical connection, or through an indirect electrical connection via other devices and connections.

Figure 1:
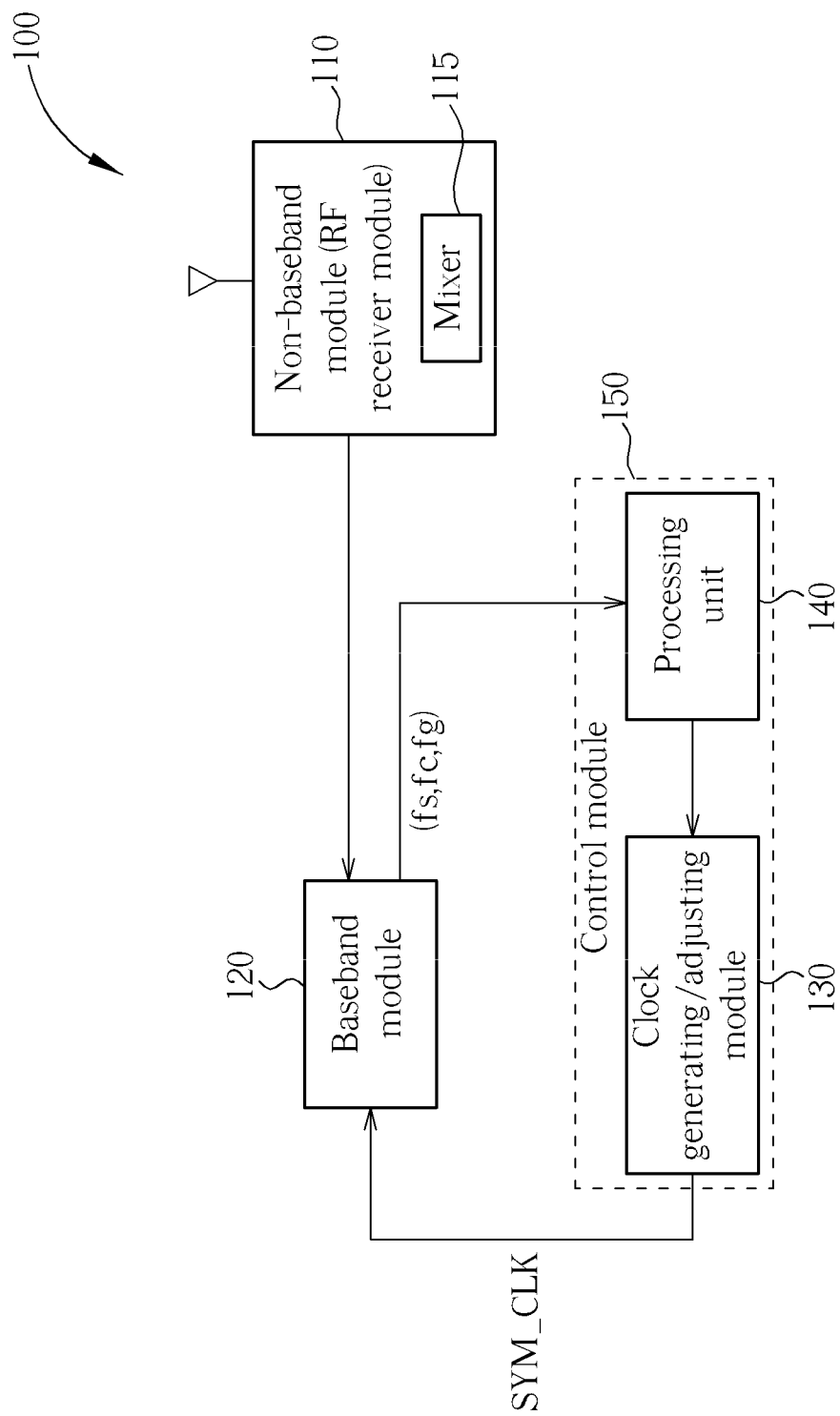
FIG. 1 is a diagram illustrating an electronic device according to a first exemplary embodiment of the present invention.

Please refer to FIG. 1. FIG. 1 is a diagram illustrating an electronic device according to a first exemplary embodiment of the present invention. The electronic device 100 includes a non-baseband module 110, a baseband module 120, and a control module 150. The control module 150 may include a clock generating/adjusting module 130, and a processing unit 140. In addition, herein the non-baseband module 110 may be an RF receiver module, which is used to process a non-baseband signal (e.g., an RF signal) in an embodiment. For example, the electronic device 100 may comply with GSM/GPRS/EDGE (Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), TD-LTE (Time Division Long Term Evolution), BT (Bluetooth), GPS (Global Positioning System), Wi-Fi, FM radio system, or other standards, according to the design specifications. The non-baseband module (e.g., the RF receiver module) 110 receives wireless RF signals via the air interface, and converts the received RF signals into baseband signals to be processed by the baseband module 120. The non-baseband module (e.g., the RF receiver module) 110 may contain hardware devices to perform radio frequency conversion. For example, the non-baseband module (e.g., the RF receiver module) 110 may contain a mixer 115 to multiply the baseband signals with a carrier oscillated in the radio frequency of the wireless communications system for signal receiving, wherein the radio frequency may be, for example, 104 MHz for a FM radio receiver module, or 936 MHz for a GSM receiver module, or others. When the non-baseband module (e.g., the RF receiver module) 110 receives the wireless radio frequency (RF) signals from a broadcast node (e.g. a cell of the wireless network, a FM radio station, an access point, a peer wireless communications device), the mixer 115 recovers the received signal into baseband signals, and the baseband module 120 then converts the baseband signals to a plurality of digital signals and processes the digital signals. In addition, the baseband module 120 may contain hardware devices to perform baseband signal processing. In an exemplary embodiment, the baseband signal processing may contain analog to digital conversion (ADC)/digital to analog conversion (DAC), gain adjustment, modulation/demodulation, encoding/decoding, and so on. However, the operations of the baseband module 120 are not a limitation of the present invention, all the circuits operated under a baseband frequency may be applied as the baseband module of the present invention; the alternative designs obey the spirit fall within the scope of the present invention. The clock generating/adjusting module 130 may include an oscillator (not shown), and the oscillator may be a VCXO (voltage-controlled crystal oscillator), a VCTXO (voltage controlled temperature compensated crystal oscillator), a DCXO (digitally controlled crystal oscillator), or others, according to the design requirements. The clock generating/adjusting module 130 provides a clock signal as the main clock to the baseband module 120 for the operations thereof, and the main clock SYM_CLK required by the baseband module 120 is also called a "system clock". Please note that the number of the non-baseband module (e.g., the RF receiver module) and the baseband module in FIG. 1 is for illustrative purposes only and is not meant to be a limitation of the present invention; for example, in other embodiments of the present invention, the electronic device may be equipped with a plurality of non-baseband modules (e.g., RF receiver modules) and/or a plurality of baseband modules according to the design variations, wherein the additional non-baseband modules (e.g., RF receiver modules)/baseband modules and electronic circuits are integrated into the SOC. The system clock SYM_CLK is required by the baseband module(s) of the electronic devices 100, and the frequency fs of the generated system clock SYM_CLK may be, for example, 26 MHz, 15.36 MHz, 30.72 MHz, 32 MHz, or others. The processing unit 140 may be a general-purposed processor or a microcontroller unit (MCU), loads and executes program codes or instructions with data in abstract data type to complete specific functions. The processing unit 140, for example, may receive first information of the non-baseband module (e.g., RF receiver module) 110, and, second information from the baseband module 120, to determine if there is a need to adjust the system clock SYM_CLK to eliminate the unwanted RF de-sensitization phenomenon at the non-baseband module (e.g., RF receiver module) 110. If so, the processing unit 140 may determine the details (e.g., the frequency characteristic) of the system clock SYM_CLK and control the clock generating/adjusting module 130 to generate an adjusted system clock accordingly, to thereby avoid the interference and ensure the RF sensitivity. For instance, the clock generating/adjusting module 130 may change the frequency of the system clock to thereby output an updated system clock having a different clock frequency. In this way, the control module 150 may reduce the interference with a receiving RF signal of a specific channel by selectively change a frequency of the system clock to avoid the RF desensitization of the electronic device 100. The first information includes a frequency characteristic of the system clock SYM_CLK and the second information includes a frequency characteristic of the non-baseband module (e.g., RF receiver module) 110, wherein details of the first information and the second information are disclosed in the following paragraphs.

Figure 2A:
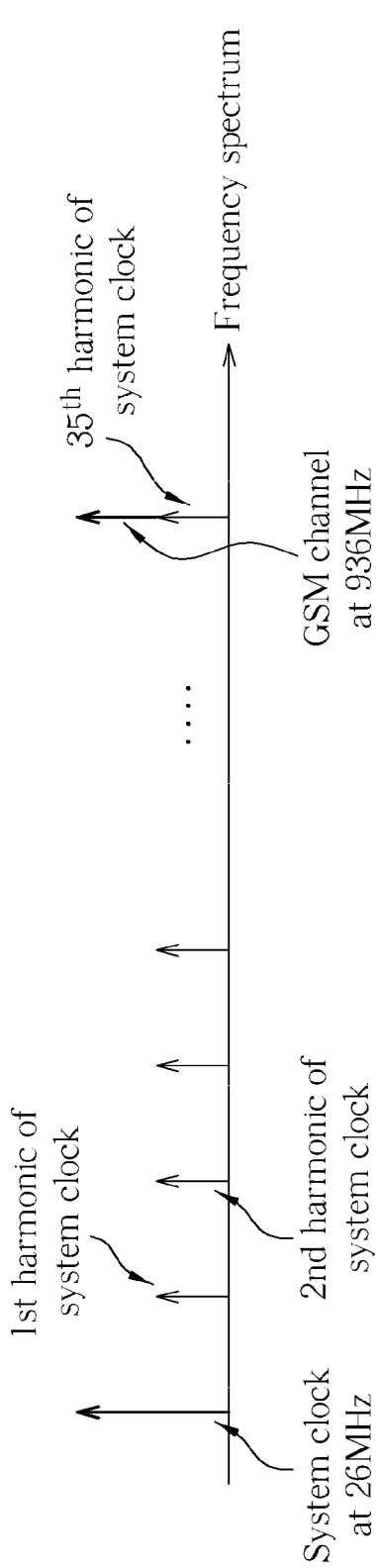
FIG. 2A is an exemplary case wherein the non-baseband module in FIG. 1 is a GSM receiver module, and a GSM receiving channel is interfered with by the harmonics of a 26 MHz system clock.

As mentioned above, a root cause of the interference may be the harmonics of the current system clock SYM_CLK required by the baseband module(s) (e.g., the first baseband module 120). Please refer to FIG. 2A and FIG. 3A. FIG. 2A is an exemplary case wherein the non-baseband module in FIG. 1 is a GSM receiver module, and a GSM receiving channel is interfered with by the harmonics of a 26 MHz system clock. FIG. 3A is an exemplary case wherein the non-baseband module in FIG. 1 is a FM receiver module, and the FM receiving channel is interfered with by the harmonics of a 26 MHz system clock.

In a GSM system, due to each channel band of the GSM system occupying 200 KHz bandwidth, the crosstalk effect is severe when the harmonics of the system clock hit the specific channel band. The specific channel band may be the channel band of a specific GSM channel that is used for receiving the incoming RF signals in an embodiment. However, in some other exemplary embodiment, the specific channel band may be the channel band of a specific GSM channel which is currently used. That is, as shown in FIG. 2A, if the currently used system clock is at 26 MHz, the 35th harmonic of the 26 MHz system clock will interfere with the specific GSM band channel, and the interference will cause the RX end (e.g., the RF receiver module) to undergo de-sensitization; where the frequency of the interfered GSM band channel is around 936 MHz. In addition, as shown in FIG. 3A, taking the FM system as another example, similarly, the de-sensitization of FM 104 MHz channel is caused by the third harmonic of the 26 MHz system clock.

To relieve the interference caused by the harmonics of the system clock and ensure the sensitivity of the RF channel corresponding to the non-baseband module (e.g., RF receiver module) 110, the processing unit 140 checks the channel band of the currently used RF channel (or the RF channel to be used), and the information corresponding to the currently used system clock (e.g., SYM_CLK) to determine whether the system clock (e.g., SYM_CLK) needs to be adjusted or not, and, when the system clock (e.g., SYM_CLK)) or its harmonics may interfere with the currently used RF channel/RF channel to be used, the processing unit 140 will control the clock generating/adjusting module 130 to adjust the system clock (e.g., SYM_CLK) in terms of an operational status of the RF receiver module. For instance, the operational status may be a status for indicating if the RF receiver module is receiving incoming signals/about to receive incoming signals. When the RF receiver module is to be used for receiving signals, the processing unit 140 may get the channel frequency of the specific channel, the guard band corresponding to the signals to be received as the second information, and get the second information corresponding to the baseband module 120 to determine if the RF de-sensitization occurs. The frequency characteristic of the first information may include a clock frequency and the harmonics of the system clock (e.g., SYM_CLK). If there is interference caused by the system clock, the control module 150 will adjust the system clock (e.g., by changing the frequency of the system clock) and thereby keep the RF performance, especially when all the elements of the electronic device 100 are integrated into an SOC.

Figure 2B:
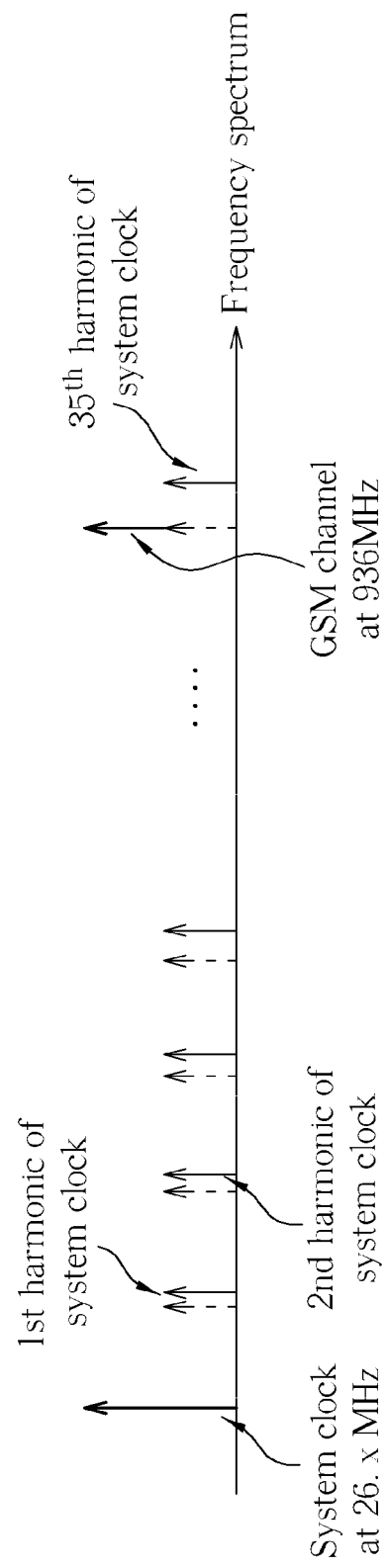
FIG. 2B is an exemplary case of the present invention which selectively adjusts the system clock and thereby ensures the sensitivity of the currently used receiving channel/receiving channel to be used when the non-baseband module (e.g., RF receiver module) complies with the GSM standard.

After the system clock (e.g., SYM_CLK) is adjusted to a proper frequency, the harmonics of the adjusted system clock will not interfere with the RF channel to be used and ensure the RF channel being free from the interference caused by the system clock (e.g., SYM_CLK). Exemplary outcomes are shown in FIG. 2B and FIG. 3B. FIG. 2B is an exemplary case of the present invention which selectively adjusts the system clock and thereby ensures the sensitivity of the currently used receiving channel/receiving channel to be used when the non-baseband module (e.g., RF receiver module) complies with the GSM standard. FIG. 3B is an exemplary case of the present invention which selectively adjusts the system clock and thereby ensures the sensitivity of the current used receiving channel/receiving channel to be used when the non-baseband module (e.g., RF receiver module) complies with the FM standard.

Figure 4:
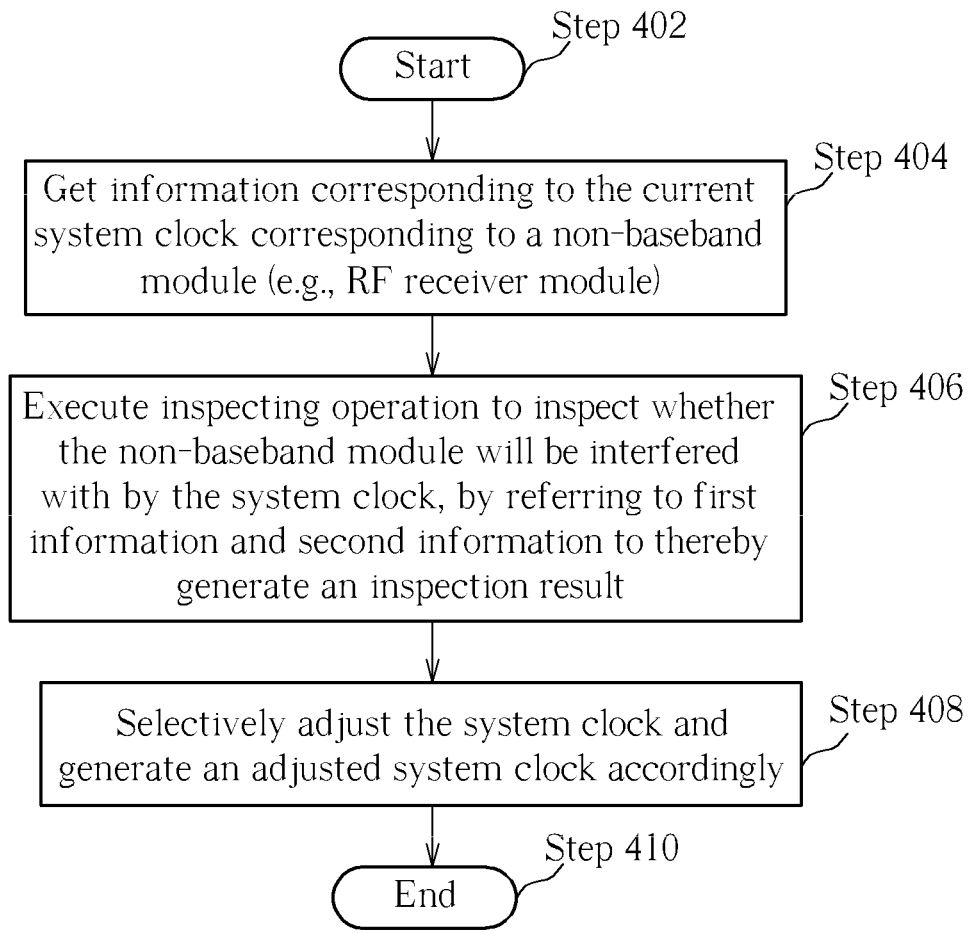
FIG. 4 is a flow chart of an exemplary embodiment of a method for adjusting a system clock in terms of an operational status of at least one non-baseband module (e.g., RF receiver module) of the present invention.

Please refer to FIG. 4 in conjunction with FIG. 1. FIG. 4 is a flow chart of an exemplary embodiment of a method for adjusting a system clock in terms of an operational status of at least one RF receiver module of the present invention. Please note that, if the result is substantially the same, the steps are not limited to be executed according to the exact order shown in FIG. 4. The flow includes the following steps:

Step 402: Start.

Step 404: Get the information corresponding to the current system clock (e.g., SYM_CLK) and the information corresponding to a non-baseband module (e.g., RF receiver module) (e.g., information corresponding to a specific RF channel to be used/currently used RF channel). In an exemplary embodiment, information corresponding to an RF channel to be used includes the frequency fc of the RF channel, and the guard band fg corresponding to the RF signals, which is chosen as the second information, while the information corresponding to the current system clock includes the frequency fs of the current system clock (e.g., SYM_CLK), and the harmonics of the current system clock (e.g., SYM_CLK), which is chosen as the first information. However, with appropriate adjustment, the method may be used to ensure the RF sensitivity of the currently used RF channel, thereby reducing the severe RF-desensitization of the non-baseband module (e.g., the RF receiver module). It is to be understood that the harmonics of the current system clock may be computed in terms of the current system clock frequency. All the alternative designs obey and fall within the scope of the present invention.

Step 406: The processing unit 140 executes an inspecting operation to inspect whether a receiving signal with a specific RF channel frequency will be interfered with by the system clock, by referring to the first information (e.g., frequency and harmonics of the system clock SYM_CLK) and the second information (e.g., frequency characteristic of the specific RF channel and the guard band fg of the RF signals) to thereby generate an inspection result. The inspection result includes if the current system clock SYM_CLK needs to be adjusted and a suitable candidate system clock. For example, a frequency of the system clock SYM_CLK is different from a candidate system clock frequency corresponding to the candidate system clock. If yes, the flow goes to Step 408; otherwise, the flow goes to Step 410.

Step 408: The processing unit 140 controls the clock generating/adjusting module 130 to adjust the system clock and the clock generating/adjusting module 130 accordingly generates an adjusted system clock.

Step 410: End.

In Step 404, the processing unit 140 may access the information, such as the frequency fs of the current system clock SYM_CLK, the harmonics of the current system clock SYM_CLK, and the frequency fc of the RF channel to be used for receiving the coming RF signals. In Step 406, the processing unit 140 determines whether to adjust the current system clock or not by executing a inspecting operation; the inspecting operation may include checking whether the frequency of the current system clock SYM_CLK/the harmonics of the current system clock SYM_CLK would interfere with the specific RF channel or not. If so, in Step 408, the clock generating/adjusting module 130 adjusts the current system clock (e.g., SYM_CLK) according to the control from the processing unit 140. That is, if needed, the processing unit 140 will tell the clock generating/adjusting module 130 how to adjust the system clock SYM_CLK and the clock generating/adjusting module 130 then generates an adjusted system clock according to the instructions from the processing unit 140. For example, a frequency fs' of the adjusted system clock different from the currently used one may be instructed. If not, the clock generating/adjusting module 130 keeps generating the system clock SYM_CLK, and the frequency fs of the system clock SYM_CLK will remain the same.

Figure 5:
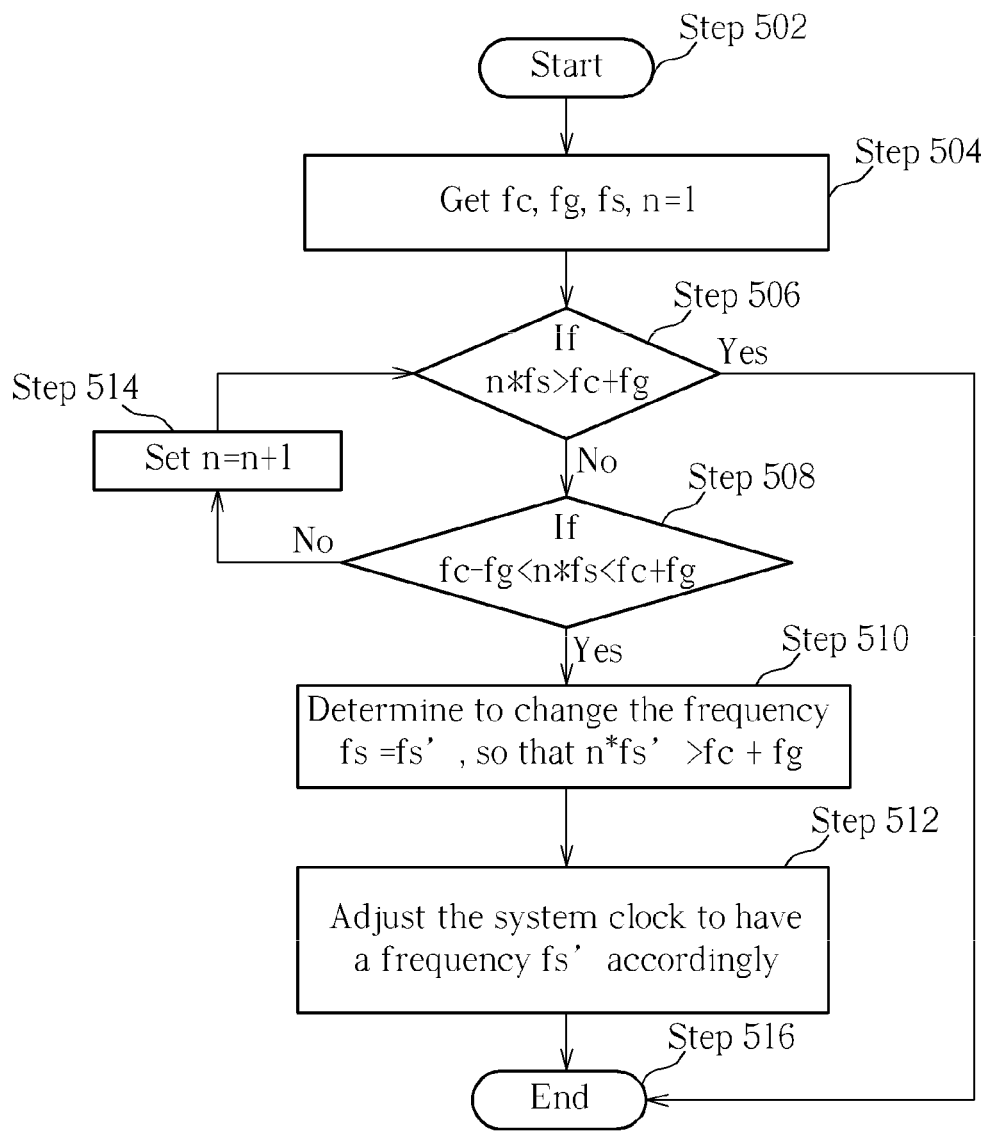
FIG. 5 is a diagram illustrating a first exemplary embodiment of a flow chart of the detailed steps shown in FIG. 4 of the present invention.

Please refer to FIG. 5 in conjunction with FIG. 4. FIG. 5 is a diagram illustrating a first exemplary embodiment of a flow chart of the detailed steps shown in FIG. 4 of the present invention. Please note that if the result is substantially the same, the steps are not limited to be executed according to the exact order shown in FIG. 5. The flow, executed by the processing unit 140, includes the following steps:

Step 502: Start.

Step 504: Get the information of four parameters fc, fs, fg, and n, wherein fc represents the frequency of a RF channel to be used for the incoming RF signals; fs represents the frequency of the current system clock SYM_CLK; fg represents a guard band corresponding to the incoming RF signals, and n=1. For example, the parameters fc, fs, and fg may be obtained from the baseband module 120.

Step 506: Check whether $n*fs > fc+fg$? If not, go to Step 508; otherwise, go to Step 516.

Step 508: Check whether $fc-fg < n*fs < fc+fg$? If yes, go to Step 510; otherwise, go to Step 514.

Step 510: Determine to adjust the frequency of the system clock from fs to fs' for making $n*fs' > fc+fg$.

Step 512: Adjust the system clock to have the frequency fs' by controlling the clock generating/adjusting module 130. For instance, the processing unit 140 may determine one of a set of candidate system clock frequencies, which satisfies the mentioned condition $n*fs' > fc+fg$, and control the clock generating/adjusting module 130 to output the system clock with the determined frequency.

Step 514: Set n=n+1. Then go back to Step 506.

Step 516: End.

According to the flow chart in FIG. 5, a loop composed of steps 506, 508 and 514 is repeatedly executed for inspecting possible harmonics until that the original system clock and its harmonics are assured not to interfere with the RF signals to be received, or until detection of the interference. In Step 506, whether $n*fs$ is greater than $fc+fg$ is checked. If so, the original system clock frequency fs as n=1 or harmonics of the original system clock $n*fs$ as n>1 will not interfere with the RF signals to be received, and the whole control flow ends. Otherwise, in Step 508, a second check is performed to determine whether $n*fs$ is less than $fc+fg$ and is greater than $fc-fg$. If not, the process recognizes that the next harmonic needs to be inspected, increments n by one and proceeds to the next run of the loop (Step 514). Otherwise, the process recognizes that the harmonic of the original system clock (SYM_CLK) will interfere with the RF signals to be received. After detecting the interference, the process determines a new frequency fs', and directs the clock generating/adjusting module 130 to output the system clock having the new frequency fs', where $n*fs'$ would be greater than $fc+fg$ (Step 510 and Step 512).

Figure 6:
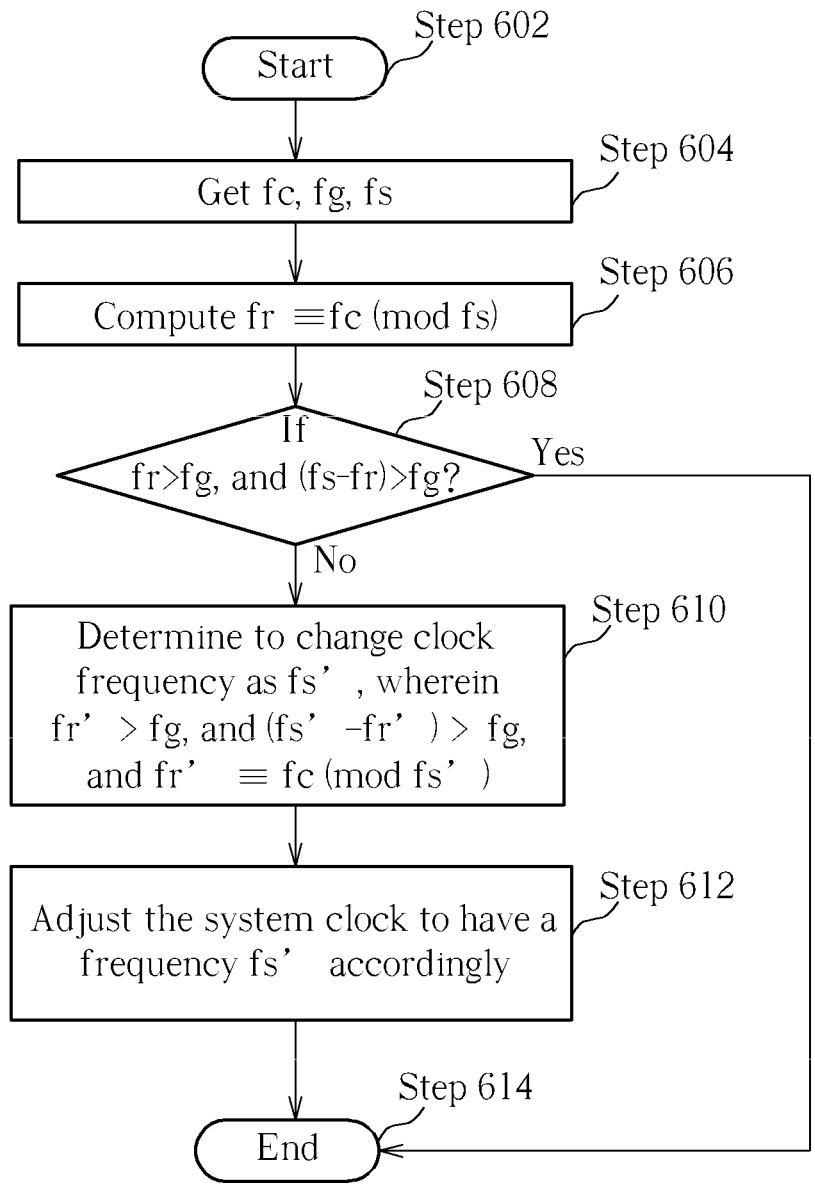
FIG. 6 is a diagram illustrating a second exemplary embodiment of a flow chart of the detailed steps shown in FIG. 4 of the present invention.

Please refer to FIG. 6 in conjunction with FIG. 4. FIG. 6 is a diagram illustrating a second exemplary embodiment of a flow chart of the detailed steps in FIG. 4 of the present invention. Please note that if the result is substantially the same, the steps are not limited to be executed according to the exact order shown in FIG. 6. The flow, executed by the processing unit 140, includes the following steps:

Step 602: Start.

Step 604: Get the information of three parameters fc, fs, fg, wherein fc represents the frequency of a RF channel to be used for the coming RF signals to be received by the corresponding RF receiver module (the non-baseband module 110); fs represents the frequency of the current system clock generated by the clock generating/adjusting module 130; and fg represents a guard band corresponding to the incoming RF signals. For example, the parameters fc, fs, and fg may be obtained from the baseband module 120.

Step 606: Execute a computation fr≡fc (mod fs), wherein fr represents the remainder of fc (mod fs).

Step 608: Check whether fr>fg, and (fs−fr)>fg? If yes, go to Step 614; otherwise, go to Step 610.

Step 610: Determine that the frequency fs of the current system clock (SYM_CLK) or the harmonics of the current system (SYM_CLK) will interfere with the RF signals to be received, and determine a new system clock frequency fs' for making fr'>fg, and fs'−fr'>fg, wherein fr'≡fc(mod fs').

Step 612: Adjust the system clock to have the frequency fs' by controlling the clock generating/adjusting module 130. For instance, the processing unit 140 may determine one of a set of candidate system clocks, which satisfies the mentioned condition fr'>fg, and fs'−fr'>fg as fr'≡fc (mod fs'), and control the clock generating/adjusting module 130 to output the system clock with the determined frequency.

Step 614: End.

The exemplary flow begins with the providing of parameters fc, fg, and fs (Step 604), and then computes fr≡fc (mod fs), where fr represents the remainder of fc (mod fs) (Step 606). Then, the process determines whether the computed remainder fr is greater than fg and fs−fr is greater than fg (Step 608). If so, the original system clock frequency will not interfere with the RF signals to be received, and the whole control flow ends (Step 614). If not, the process recognizes that the harmonic/frequency fs of the original system clock SYM_CLK will interfere with the RF signals, and directs the frequency fs of the system clock to be adjusted to fs', so that fr' will be greater than fg, and fs'−fr' will be greater than fg, as fr'≡fc (mod fs'), where fr' represents the remainder of fc (mod fs'). By controlling the clock generating/adjusting module 130 to adjust the system clock required by the baseband module(s) (e.g., the baseband module 120), the RF sensitivity of the electronic device 100 is guaranteed.

The number of the candidate system clock frequencies is not a limitation of the present invention.

An exemplary case is provided below with reference to FIG. 6. The example gives fc as 104 MHz, fg as 0.5 MHz and fs as 26.1 MHz, and the computed remainder fr is 25.7 MHz. Then, the process inspects that (fs−fr)=0.4 MHz is fewer than the given fg; that is, a harmonic of the frequency fs of the current system clock (e.g., SYM_CLK) will interfere with the RF signals at the frequency fc. In such a case, the clock generating/adjusting module 130 will be controlled to output an adjusted system clock, wherein the frequency of the adjusted system clock is fs'=26.2 MHz, enabling fr'=25.4 M to be greater than fg, and fs'−fr'=0.8 MHz to be greater than fg as fr'≡fc (mod fs').

A further exemplary case is provided below with reference to FIG. 6. The example gives fc as 104 MHz, fg as 0.5 M and fs as 25.9 MHz, and the computed remainder fr is 0.4 MHz. Then, the process inspects that fr is less than the given fg; that is, a harmonic of the frequency fs of the system clock SYM_CLK will interfere with the RF signals at the frequency fc. In such a case, the system clock is determined to be adjusted, so that the frequency of the adjusted system clock is fs'=25.8 MHz, thereby enabling fr'=0.8 MHz to be greater than fg, and fs'−fr'=25 MHz to be greater than fg as fr'≡fc (mod fs').

Figure 7:
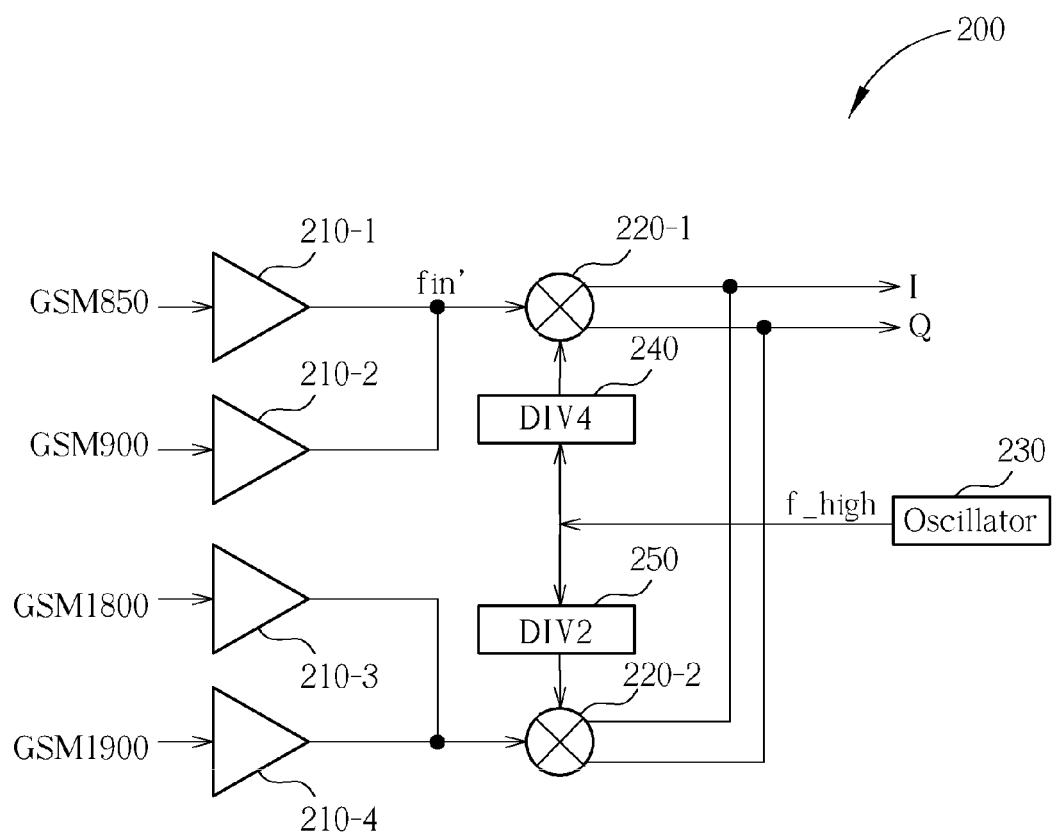
FIG. 7 is a diagram illustrating a RF receiver module according to a second exemplary embodiment of the present invention.

Please refer to FIG. 7. FIG. 7 is a diagram illustrating a RF receiver module according to a second exemplary embodiment of the present invention. The RF receiver module 200 may be applied as the non-baseband module 110 in FIG. 1. The RF receiver module 200 complies with the GSM standard, and includes low noise amplifiers (LNA) 210-1~210-4, where each of the LNA 210-1~210-4 corresponds to a particular channel band. In this exemplary embodiment, the RF receiver module 200 is a GSM receiver module, and four channel bands of the GSM receiver are: GSM 850, GSM 900, GSM 1800, and GSM 1900. In addition to the RF signals to be received by the RF channel, such as signals (fin') after a low noise amplifier 210-2 corresponding to the GSM 900 channel, the frequency of the system clock (e.g., SYM_CLK) may also interfere with signals at a high frequency provided by a oscillator 230, such as 3739.7 MHz. In an embodiment, the oscillator 230 is a local oscillator of the receiving end. As shown in FIG. 7, the frequency signals (e.g., f_high) are divided by four by a divider 240, and then are mixed with the received RF signals (e.g., fin') after the LNA 210-2. As shown in FIG. 7, the interference with the high frequency signals (e.g., f_high) also causes RF de-sensitization. It is to be understood that those artisans may consider more signals that may cause RF de-sensitization when being interfered with by a harmonic of the system clock (e.g., SYM_CLK). All these alternative designs fall within the scope of the present invention.

In order to take the further interferences into account, the adjusting method in FIG. 5 and FIG. 6 may be respectively executed to obtain two or more candidate system clock frequencies fs'. However, when a harmonic of the system clock at a first candidate frequency will interfere with the RF channel which receives the receiving RF signals (e.g., the signal fin' after the LNA 210-2 corresponding to the GSM900 channel) (FIG. 7), and a harmonic of the system clock at a second candidate frequency will interfere with the high frequency signals (e.g., f_high) to be mixed with the RF channel signals (FIG. 7), a proper candidate clock frequency will be selected therefrom accordingly to ensure the RF performance. An exemplary embodiment of a flow chart for deciding a proper candidate system clock frequency for solving interferences to at least two signals corresponding to RF signals to be received in the RF receiver module in FIG. 4 is introduced in FIG. 8. In addition, the RF receiver module 200 may further include a mixer 220-2, and a divider 250, and the oscillator 230 may be implemented by a high frequency oscillator. Since the operations and structure of the RF receiver module 200 are well known by people skilled in this art, further descriptions are omitted here for the sake of brevity.

Figure 8:
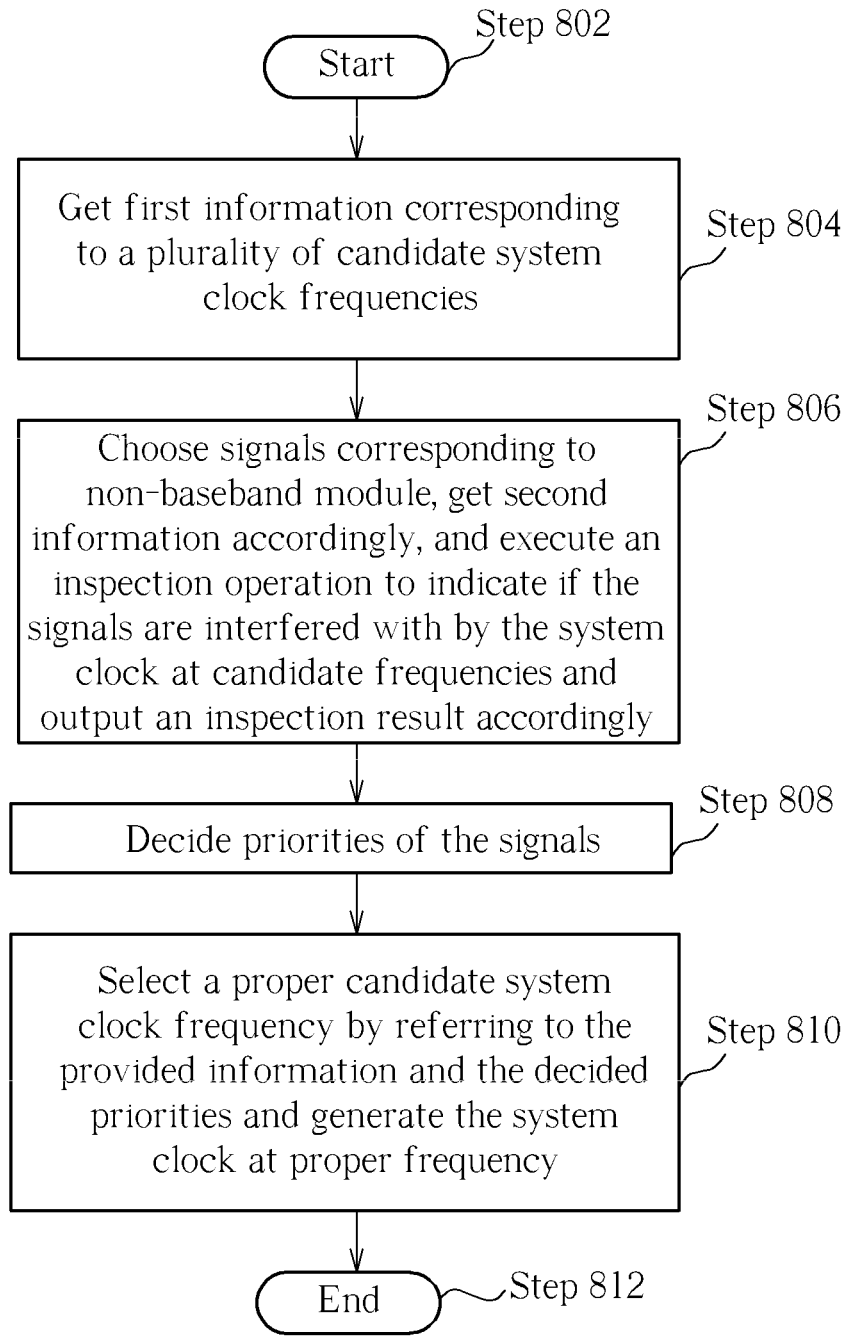
FIG. 8 is a diagram illustrating an exemplary embodiment of a flow chart for deciding a proper candidate system clock frequency in response to at least two signals corresponding to the RF receiver module in FIG. 4.

Please refer to FIG. 8 in conjunction with FIG. 7. Please note that if the result is substantially the same, the steps are not limited to be executed according to the exact order shown in FIG. 8. The flow executed by the processing unit 140 includes the following steps:

Step 802: Start.

Step 804: Get the information (e.g., first information) corresponding to a plurality of candidate system clock frequencies. For example, the processing unit 140 can get a first candidate system clock frequency fs1 and a second candidate system clock frequency fs2 from a corresponding baseband module (e.g., the baseband module 120). In one embodiment, the types of signals that need to be protected are fixed. In other embodiments, the processing unit 140 may select the signals that need to be protected dynamically, so that the control module 150 can choose a best one from candidate system clock frequencies and thereby promote the RF performance according to different design requirements.

Step 806: The processing unit 140 chooses which signals corresponding to the non-baseband module (e.g., RF receiver module 200) need to be protected from interference, gets second information corresponding to the signals that need to be protected, and executes an inspection operation to indicate if the signals that need to be protected are interfered with by the system clock at candidate frequencies or not, and outputs an inspection result accordingly. For example, the signals corresponding to the non-baseband module (e.g., the RF receiver module 200) may include a first signal at the receiving end (e.g., the signal fin' after the LNA210-2 when the GSM900 channel is the RF channel to be used), and may include a second signal (e.g., high frequency signal f_high) generated from the oscillator 230 (FIG. 7).

Step 808: The processing unit 140 decides priorities of the signals to be protected. For example, the processing unit 140 determines the priorities of the first signal at the receiving end (e.g., the signal fin' after being executed by the LNA210-2 when the GSM900 channel is the RF channel to be used), and of the second signal (e.g., high frequency signal f_high) generated from the oscillator 230. Information regarding the priorities may be hard coded by program codes or instructions. Alternatively, the processing unit 140 may retrieve one or more pre-stored data values indicating the priorities among different signals from a memory or a storage device to decide the priorities.

Step 810: The processing unit 140 selects one from the candidate system clock frequencies by referring to the provided information and the decided priorities. In some embodiments, after the appropriate candidate system clock frequency is determined, according to the design requirements the processing unit 140 may further control the clock generating/adjusting module 130 to output the system clock at the appropriate frequency. For example, when there are two candidate system clock frequencies, the inspection result shows that the first signal is less interfered with by a first candidate system clock frequency than by the second one, the second signal is less interfered with by the second one than by the first one, and the priority of the first signal is higher than that of the second signal, the processing unit 140 controls the clock generating/adjusting module 130 to output the system clock at the first candidate clock frequency.

Step 812: End.

In FIG. 8, the process starts by providing the information regarding a plurality of candidate system clock frequencies; the provided information can be used to output a system clock at a proper frequency by the clock generating/adjusting module (e.g., the clock generating/adjusting module 130) (Step 804). In Step 806, the Information regarding harmonics corresponding to each candidate system clock frequency that affects particular signals in the RF receiver module 200 is provided as well. By applying the method disclosed in FIG. 8, the electronic device including the RF receiver module 200 can ensure its performance by choosing a proper system clock frequency, especially when the elements (including a baseband module and the RF receiver module) are integrated into a chip (SOC).

Figure 9:
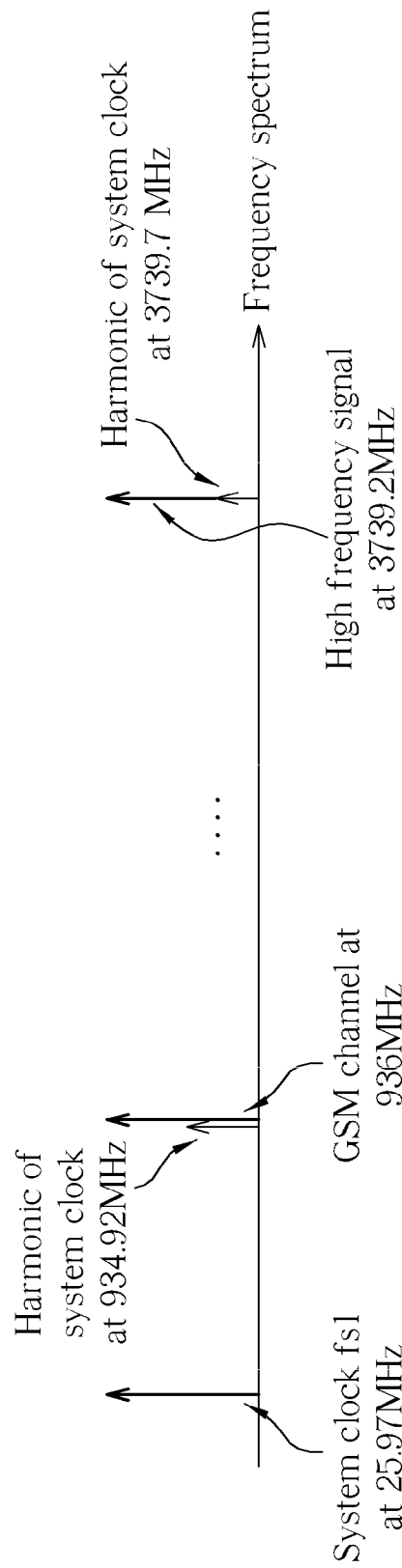
FIG. 9 is an exemplary case illustrating signals corresponding to RF signals to be received are interfered with by the system clock at a candidate frequency, where the interfered signals include the RF channel and a high frequency signal in the RF receiver module with reference to an example of the RF receiver module in FIG. 7.
Figure 10:
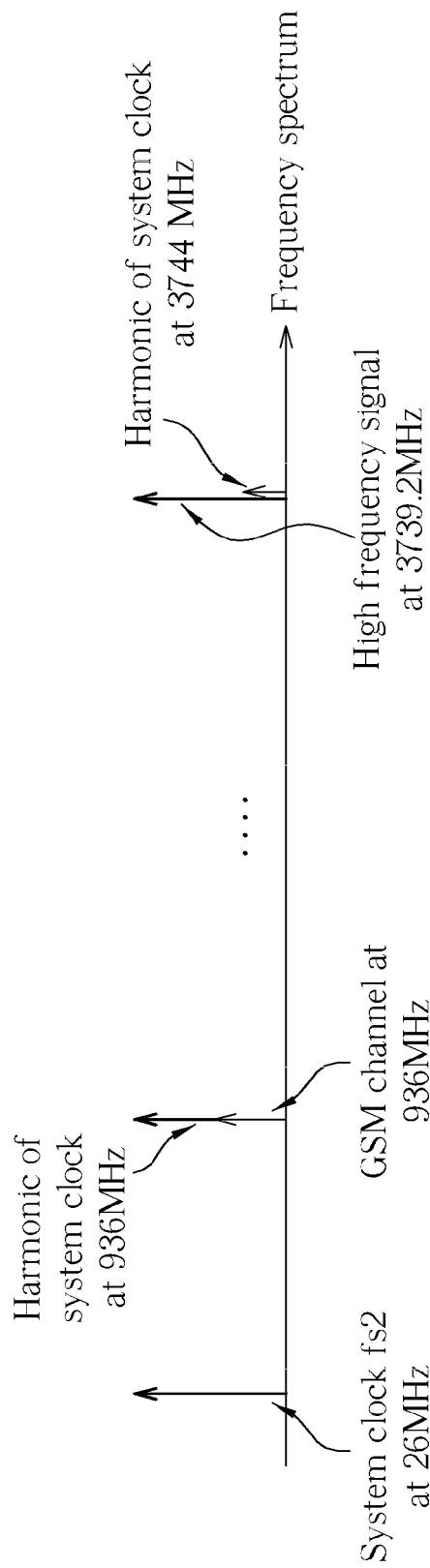
FIG. 10 is another exemplary case illustrating signals corresponding to RF signals to be received are interfered with by the system clock at another candidate frequency, where the interfered signals include the RF channel and a high frequency signal in the RF receiver module with reference to an example of the RF receiver module in FIG. 7.

Please refer to FIG. 9 and FIG. 10 in conjunction with FIG. 7 and FIG. 8. FIG. 9 is an exemplary case illustrating signals corresponding to RF signals to be received are interfered with by the system clock at a candidate frequency (e.g., the first candidate system clock frequency fs1), where the interfered signals include the RF channel (e.g., a GSM channel) and a high frequency signal (e.g., high frequency signal f_high generated by the oscillator 230) in the RF receiver module with reference to an example of the RF receiver module in FIG. 7. FIG. 10 is another exemplary case illustrating signals corresponding to RF signals to be received are interfered with by the system clock at another candidate frequency (e.g., the second candidate system clock frequency fs2), where the interfered signals include the RF channel (e.g., a GSM channel) and a high frequency signal (e.g., high frequency signal f_high generated by the oscillator 230) in the RF receiver module with reference to an example of the RF receiver module in FIG. 7. In FIG. 9 and FIG. 10, assume that frequency of the RF signal to be received is at 936 MHz, the high frequency signal generated by the oscillator 230 is at 3739.2 MHz and the guard band fg is 1 MHz. Two candidate system clock frequencies, fs1=25.97 MHz and fs2=26 MHz, may be obtained by one embodiment of the process as shown in FIG. 5 or FIG. 6, respectively. That is, the first candidate system clock frequency fs1, and the second candidate system clock frequency fs2 may be obtained by executing one of the processes disclosed in FIG. 5 or FIG. 6. It is to be understood that those skilled in this art may obtain more than two candidate system clock frequencies according to different design requirements. In FIG. 9, a harmonic of the system clock at the first frequency fs1 will interfere with the high frequency signals at 3739.2 MHz, while, in FIG. 10, a harmonic of the system clock at the second frequency fs2 will interfere with the RF signals to be received at the GSM channel.

With reference to the provided information, the electronic device including the RF receiver module 200 will decide priorities of each of the signals in the RF channel/RF receiver module, such as the receiving signals at the RF channel to be used, and the high frequency signals (e.g., the signals f_high generated by the oscillator 230). The priorities of the signals that need to be protected are used to select one candidate system clock frequency and thereby reduce the RF de-sensitization of the RF receiver module 200. For example, if the priorities are preset to select an operating frequency so that harmonics of the system clock will less affect a signal at a lower frequency in the RF channel, such as the RF channel signals at 936 MHz, then the processing unit 140 will select the first candidate system clock frequency fs1=25.97 MHz. More clearly, the processing unit 140 may control the clock generating/adjusting module 130 to adjust the system clock at fs1 (at 25.97 MHz). If the priorities are preset as a high frequency signal (e.g., high frequency signal f_high generated by the oscillator 230) having a higher priority than that of an RF signal to be received by an RF channel (e.g., GSM channel around 936 MHz), an operating frequency is selected such that harmonics of the system clock will less affect a signal at a higher frequency in the RF receiver module 200, such as the high frequency signals (e.g., f_high) at 3739.2 MHz. Then, the processing unit 140 will control the clock generating/adjusting module 130 to adjust the system clock at fs2 (at 26 MHz). The clock generating/adjusting module 130 then outputs the system clock at fs2 (at 26 MHz).

By executing the method provided in FIG. 8, the signals in the RF receiver module which needs to be less affected by the interference is thereby protected, by choosing a proper system clock frequency. However, the aforementioned rule for determining the priorities of each of the signals needing to be protected is for illustrative purposes only, and not a limitation of the present invention. For example, when the electronic device has a plurality of non-baseband modules, and all the non-baseband modules and baseband modules are integrated into a chip (SOC), the rule can be set so that a RF signal to be received by a GSM channel has a higher priority than a RF signal corresponding to another non-baseband module complying with a wireless communications standard different from the GSM standard. All these alternative designs fall within the scope of the present invention.

Sometimes an electronic device may be equipped with more than one wireless communications system, and the elements of the two wireless communications systems and other elements (e.g., the baseband modules) of the electronic device may be integrated into a SOC. However, each of the RF channels corresponding to each of the wireless communications systems may be interfered with, for example, by the harmonics of the system clock required by the corresponding baseband module, thereby degrading the sensitivity of the electronic device.

Figure 11:
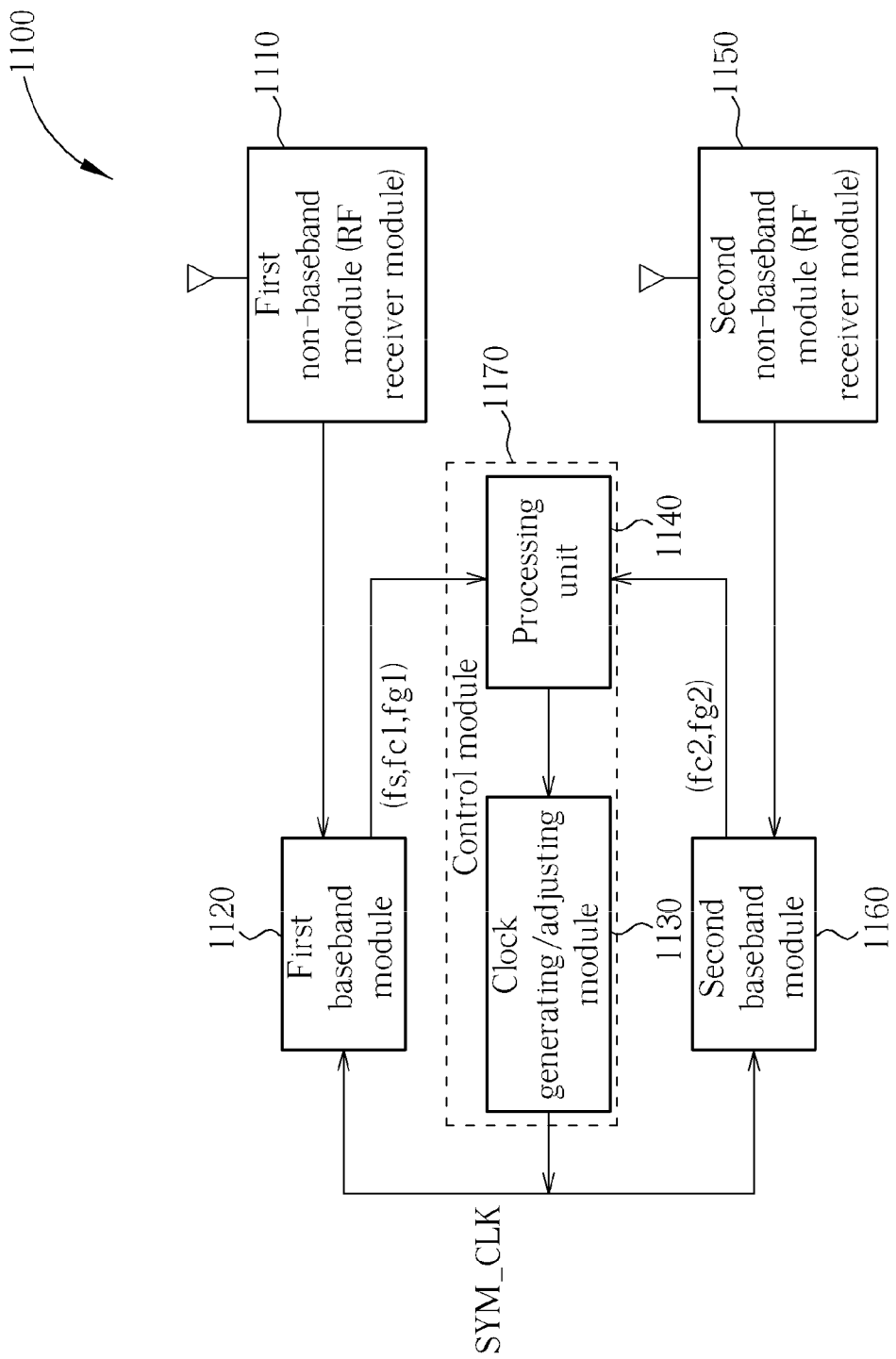
FIG. 11 is a diagram illustrating an electronic device having two different wireless communications systems and all the elements of the electronic device are integrated into a single chip according to a third exemplary embodiment of the present invention.

Please refer to FIG. 11. FIG. 11 is a diagram illustrating an electronic device 1100 having two different wireless communications systems according to a third exemplary embodiment of the present invention. The electronic device 1100 may selectively adjust the system clock in terms of different RF receiving channels to be used for different wireless communications systems, thereby ensuring the sensitivity of the wireless communications systems. For example, the first wireless communications system includes a first RF receiver module 1110, and may comply with one standard of GSM/GPRS/EDGE, WCDMA, cdma2000, WiMAX, TD-SCDMA, LTE, TD-LTE, Bluetooth, GPS, Wi-Fi, and FM radio system while the second system may comply with another standard of the listed systems. The second wireless communications system includes a second RF receiver module 1150. However, as is well known by people skilled in this art, the standards be other unlisted wireless communications standards, and all these alternative designs fall within the scope of the present invention. Moreover, the first baseband module 1120 and the second baseband module 1130 are circuits for processing signals at basebands; for example, the first baseband module 1120 and the second baseband module 1130 are circuits for processing communications signals transmitting from the first non-baseband module (e.g., RF receiver module) 1110 and the second non-baseband module (e.g., RF receiver module) 1150, respectively. However, the detailed operations of the baseband modules 1120 and 1130 are not a limitation of the present invention. All circuits being operated at a low frequency (baseband) can be the baseband modules in the present invention, and all these alternative design fall within the scope of the present invention.

In FIG. 11, the two baseband modules (e.g., the first baseband module 1120 and the second baseband module 1130) share a single system clock SYM_CLK, wherein the system clock is generated and/or adjusted by the clock generating/adjusting module 1130. Suppose that, at a specific time, both of the two wireless communications systems receive signals at different RF channels with different frequencies, respectively, and the frequencies of the different RF channels are interfered with by harmonics of the system clock SYM_CLK.

Please note that, in some embodiments, those skilled in this art may integrate the processing unit 1140 into one of the baseband modules (e.g., the first baseband module 1120 or the second baseband module 1160), according to the design requirements. Since the structure and the operations of the non-baseband modules (e.g., RF receiver modules) 1110 and 1150, the baseband modules 1120 and 1130, and the control module 1170 including the processing unit 1140 and the clock generating/adjusting module 1130 have been disclosed previously, further descriptions are omitted here for the sake of brevity.

The adjustment as shown in FIG. 5 or FIG. 6 can be used to obtain two or more candidate system clock frequencies fs'. However, the electronic device 1100 may alternatively apply other methods to get a plurality of candidate system clock frequencies fs', and all these alternative designs fall within the scope of the present invention. As a harmonic of the system clock at one candidate frequency interferes with (or damages) signals at one RF channel for a first wireless communications system while a harmonic of the system clock at another candidate frequency interferes with signals at another RF channel for a second wireless communications system, an embodiment of a process is introduced in FIG. 12 for deciding a proper system clock frequency from the candidate ones.

Figure 12:
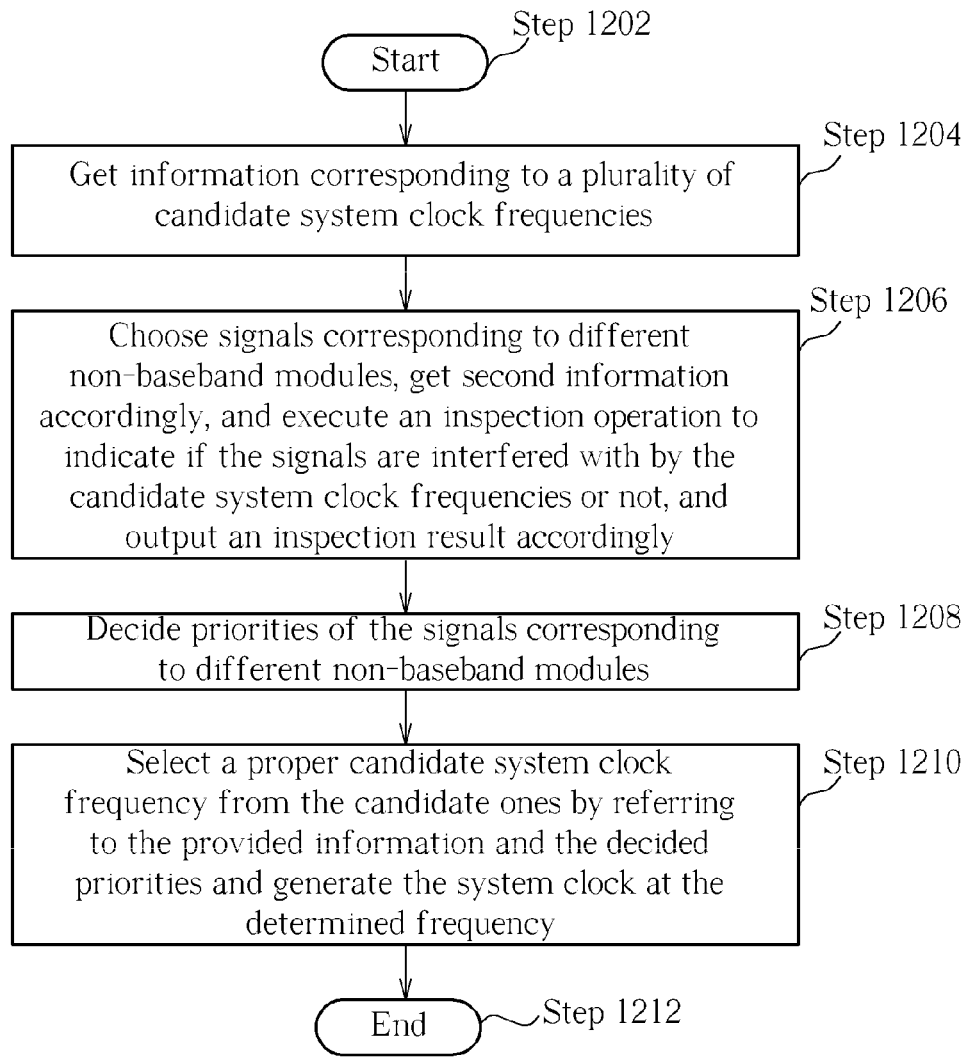
FIG. 12 is an exemplary embodiment of the flow chart of a method for deciding a proper system clock frequency from a plurality of candidate ones in terms of signals at different RF channels corresponding to different wireless communications systems with reference to an exemplary embodiment of the electronic device in FIG. 11.

Please refer to FIG. 12 in conjunction with FIG. 11. FIG. 12 is an exemplary embodiment of the flow chart of a method for deciding a proper system clock frequency from a plurality of candidate ones in terms of signals at different RF channels corresponding to different wireless communications systems with reference to an exemplary embodiment of the electronic device 1100 in FIG. 11. Please note that if the result is substantially the same, the steps are not limited to be executed according to the exact order shown in FIG. 12. The flow includes the following steps:

Step 1202: Start.

Step 1204: Get the information (e.g., first information) corresponding to a plurality of candidate system clock frequencies. For example, the processing unit 140 can get a first candidate system clock frequency fs1 and a second candidate system clock frequency fs2 from a corresponding baseband module (e.g., one of the first baseband module 1120 and the second baseband module 1160). However, in other exemplary embodiments, the number of candidate system clock frequencies may be more than two according to the design requirements.

Step 1206: The processing unit 1140 chooses which signals that need to be protected corresponding to different non-baseband modules (e.g., RF receiver modules), get the second information corresponding to the signals that need to be protected, and executes an inspection operation to indicate if harmonics of each of the candidate system clock frequencies will interfere with the signals that need to be protected, and generates an inspection result accordingly. For examples, the signals which need to be protected correspond to RF channels to be used by different wireless communications systems. That is, the signals may include a first signal corresponding to the first non-baseband module (e.g., RF receiver module) 1110 and a second signal corresponding to the second non-baseband module (e.g., RF receiver module) 1150 respectively.

Step 1208: The processing unit 1140 decides priorities of the signals to be protected corresponding to different non-baseband modules (e.g., RF receiver modules). Information regarding the priorities may be hard coded by program codes or instructions. Alternatively, the processing unit 140 may retrieve one or more pre-stored data values indicating the priorities among different signals from a memory or a storage device to decide the priorities. For example, the processing unit 140 determines the priorities of the first signal corresponding to the first RF receiver module 1110 and of the second signal corresponding to the second RF module 1160, wherein the wireless communications standard complied with by the first non-baseband module (e.g., RF receiver module) 1110 is different from that complied with by the non-baseband module (e.g., RF receiver module) 1160. In an exemplary embodiment, the first non-baseband module 1110 is a first RF receiver module complying with the GSM standard and the second non-baseband module 1150 is a second RF receiver module complying with the WIFI standard. A rule can be set so that a signal (e.g., RF receiving signal) corresponding to a GSM channel has a higher priority than other signals. However, the rules of the priorities of the signals to be protected may vary according to the design requirements, and all these alternative designs obey and fall within the scope of the present invention.

Step 1210: The processing unit 1140 selects one candidate system clock frequency from all the candidate ones by referring to the provided information and the priorities. In some embodiments, after the appropriate candidate system clock frequency is determined, the processing unit 1140 may further control the clock generating/adjusting module 11130 to output the system clock at the determined frequency. For example, when the inspection result shows that the first signal is less interfered with by harmonics of the system clock at the first candidate system clock frequency than by that at the second candidate system clock frequency, the second signal is less interfered with by harmonics of the system clock at the second candidate system clock frequency than by that at the first candidate system clock frequency, and the priority of the first signal is higher than that of the second signal, the processing unit 1140 will control the clock generating/adjusting module 1130 to output the system clock at the first candidate system clock frequency.

Step 1212: End.

The process starts by providing information regarding multiple candidate system clock frequencies. Information regarding harmonics of the system clock at each candidate system clock frequency interfering with different RF channels to be received for different wireless communications systems (e.g., the wireless communications systems having the first RF receiver module 1110 and the second RF receiver module 1150 respectively) is provided as well. By applying the method disclosed in FIG. 12, the electronic device 1110 can ensure its performance/sensitivity by choosing a proper system clock frequency.

Figure 13:
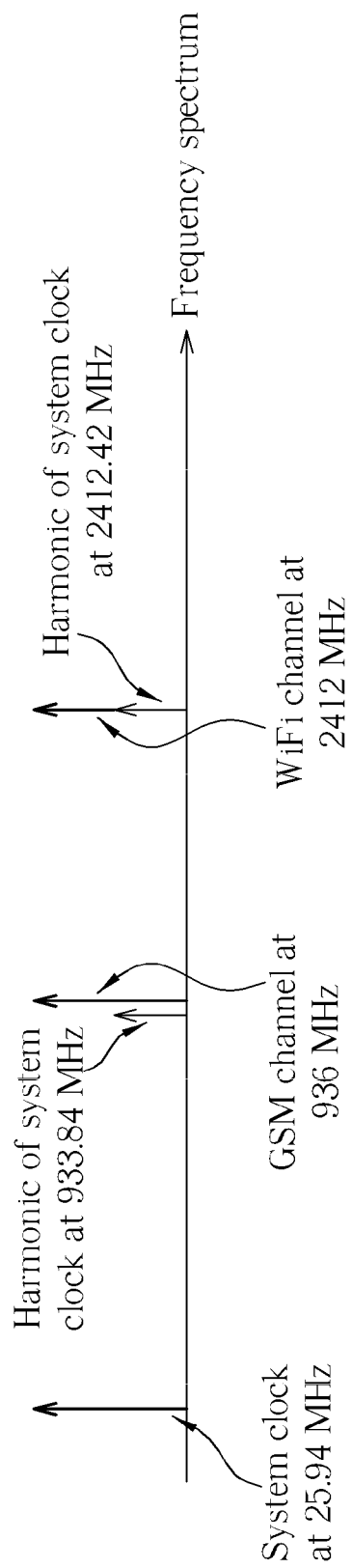
FIG. 13 is an exemplary case illustrating interferences of different RF channels caused by harmonics of the system clock at a first candidate system clock frequency with reference to an exemplary embodiment of the electronic device.
Figure 14:
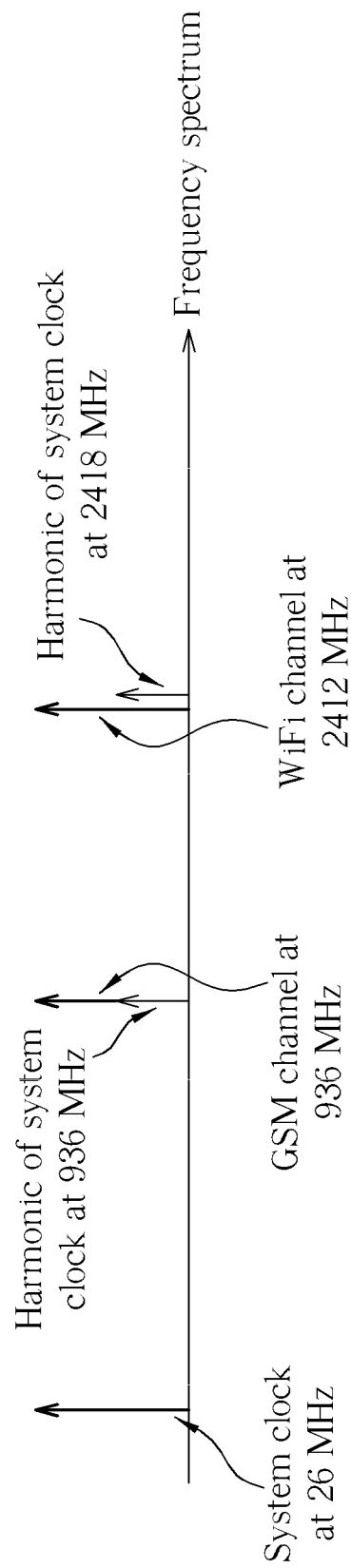
FIG. 14 is another exemplary case illustrating interferences of different RF channels caused by harmonics of the system clock at a second candidate system clock frequency with reference to an exemplary embodiment of the electronic device.

Please refer to FIG. 13 and FIG. 14 in conjunction with FIG. 11 and FIG. 12, FIG. 13 is an exemplary case illustrating interferences of different RF channels caused by harmonics of the system clock at a first candidate system clock frequency fs1' with reference to an exemplary embodiment of the electronic device 1100. FIG. 14 is another exemplary case illustrating interferences of different RF channels caused by harmonics of the system clock at a second candidate system clock frequency fs2' with reference to an exemplary embodiment of the electronic device 1100. In FIG. 13 and FIG. 14, for example, assume that the first and second wireless communications systems are GSM/GPRS/EDGE and WiFi systems respectively, an RF signal (e.g., a first signal) to be received for the first receiver module 1110 complying with the GSM/GPRS/EDGE system is at fc1=936 MHz with a guard band fg1=1 MHz, and an RF signal (e.g., a second signal) to be received for the second receiver module 1150 complying with the WiFi system is at fc2=2412 MHz with a guard band fg2=1 MHz. Similarly, the two candidate system clock frequencies fs1 and fs2 can be obtained by some embodiments of the process as shown in FIG. 5 or FIG. 6. Herein the frequency of the first candidate system clock fs1' is 25.94 MHz, and the frequency of the second candidate system clock fs2' is 26 MHz. It is to be understood that those skilled in this art may obtain more candidate system clock frequencies, according to different design requirements. All these alternative designs fall within the scope of the present invention.

In FIG. 13, a harmonic of the system clock at the first candidate system clock frequency fs1' interferes with the WiFi RF channel at 2412 MHz while a harmonic of the system clock at the second candidate system clock frequency fs2' interferes with the GSM/GPRS/EDGE RF channel at 936 Mhz. With reference to the provided information, a rule can be set to select one candidate system clock frequency from the candidate ones. For example, if the rule sets that an RF signal corresponding to the GSM/GPRS/EDGE system has a higher priority than other signals, then a system clock whose harmonics will less affect the RF channel for the GSM/GPRS/EDGE system is selected. That is, if the inspection operation executed by the processing unit 1140 reports the situations shown in FIG. 12 and FIG. 13 and the rule states that signals corresponding to the GSM/GPRS/EDGE system have higher priority over that corresponding to the WIFI system, then the first candidate system clock frequency fs1'=25.94 MHz is selected as a frequency of the system clock outputted by the clock generating/adjusting module 1130. Otherwise, if the processing unit 1140 selects the second candidate system clock with a frequency fs2' under the opposite rule, the clock generating/adjusting module 1130 will output the system clock at 26 MHz accordingly. By executing the method provided in FIG. 12, the RF channel needing to be less affected by the interference is thereby protected by choosing a proper system clock.

Figure 15:
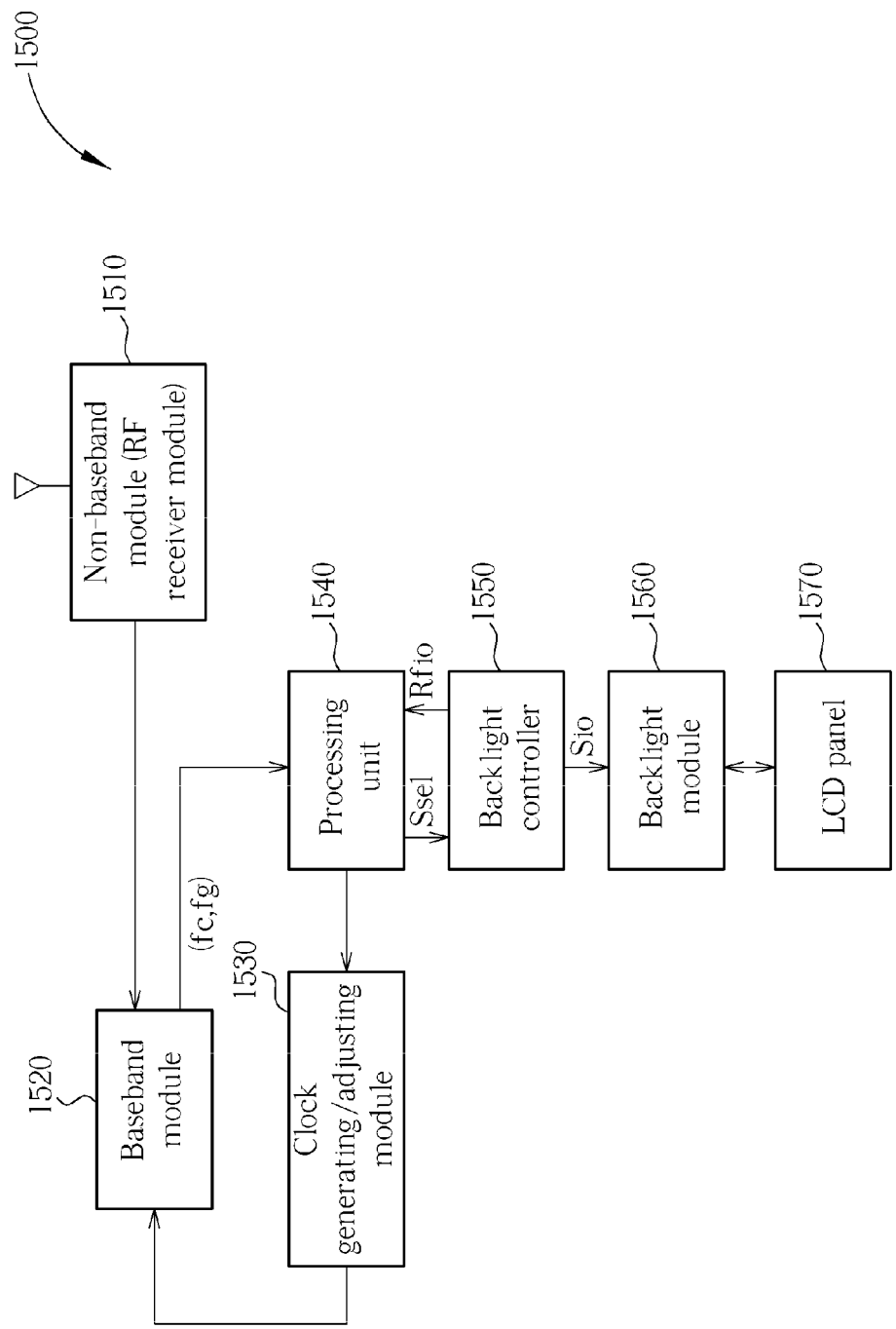
FIG. 15 is a diagram illustrating an electronic device according to a fourth exemplary embodiment of the present invention.

In addition to the harmonics of the system clock, the harmonics of IO data transceiving may be another cause of de-sensitized RF signals. Please refer to FIG. 15. FIG. 15 is a diagram illustrating an electronic device 1500 according a fourth exemplary embodiment of the present invention. The electronic device 1500 includes a first RF receiver module 1510, a first baseband module 1520, a clock generating/adjusting module 1530, and a processing unit 1540. The electronic device 1500 may comply with GSM/GPRS/EDGE, cdma2000, WiMAX, TD-SCDMA, LTE, TD-LTE, BT, GPS, Wi-Fi, FM radio system, or other standards, according to the design verification. As shown in FIG. 15, for example, the electronic device 1500 may be further equipped with a peripheral device, such as a light-emitting diodes (LED) backlight module 1560 to illuminate a liquid crystal display panel (LCD) 1570 from the side or back of the LCD panel 1570. The backlight module 1560 may be controlled to be brighter or darker by providing varied signal frequencies as data input via a backlight controller 1550. The first RF receiver module 1510, the first baseband module 1520, the clock generating/adjusting module 1530, the processing unit 1540, and the backlight controller 1550 may be integrated into a SOC. In this way, the harmonics of the backlight control signal Sio at a frequency fio may interfere with the RF channel to be used, as in the system clock interference discussed above.

Figure 16:
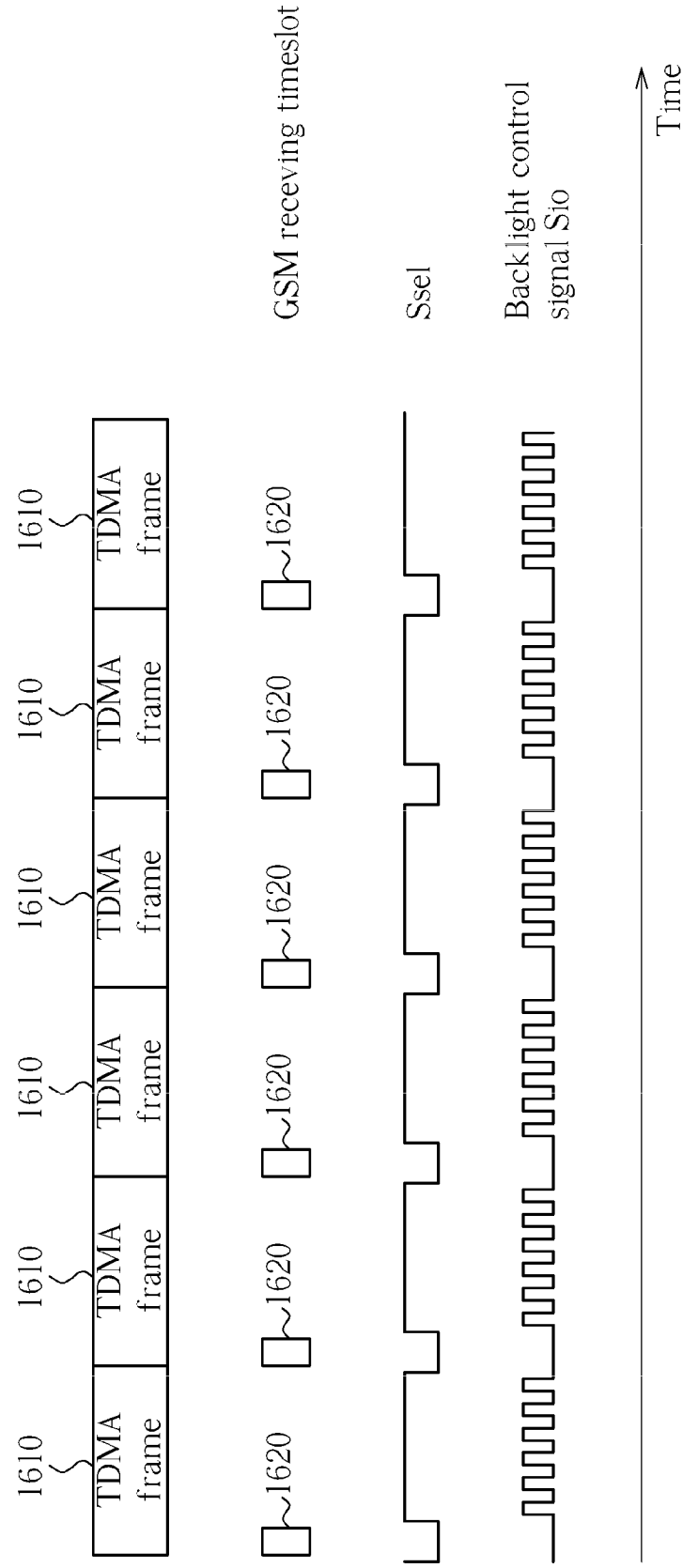
FIG. 16 is a diagram illustrating an exemplary timing sequence of a GSM receiving timeslot, a control signal and a backlight control signal.

Please refer to FIG. 16 in conjunction with FIG. 15. FIG. 16 is a diagram illustrating an exemplary timing sequence of a GSM receiving timeslot, a control signal and a backlight control signal. For example, the processing unit 1540 may output a control signal Ssel at a low or high level to the backlight controller 1550 during each receiving timeslot (e.g., GSM receiving timeslot) 1620 at each TDMA (Time division Multiple Access) frame 1610 and thereby disable the control operations (e.g., backlight control signals Sio) from the backlight controller 1550 to the backlight module 1560 accordingly. For example, the processing unit 1540 may instruct the backlight controller 1550 to stop transmitting signals (e.g., backlight control signals Sio) to the backlight module 1560 at every first ⅛ of the TDMA frame 1610, thereby preventing the received GSM signals being received at the receiving time slot 1620 from being interfered with by the harmonics of the signals (e.g., the backlight control signals Sio) from the backlight controller 1550 to the backlight module 1560. As is well known by people skilled in this art, the standard complying with the RF receiver module 1510 may be a communications system standard other than the GSM standard. All alternative designs obeying the spirit of the invention fall within the scope of the present invention.

Figure 17:
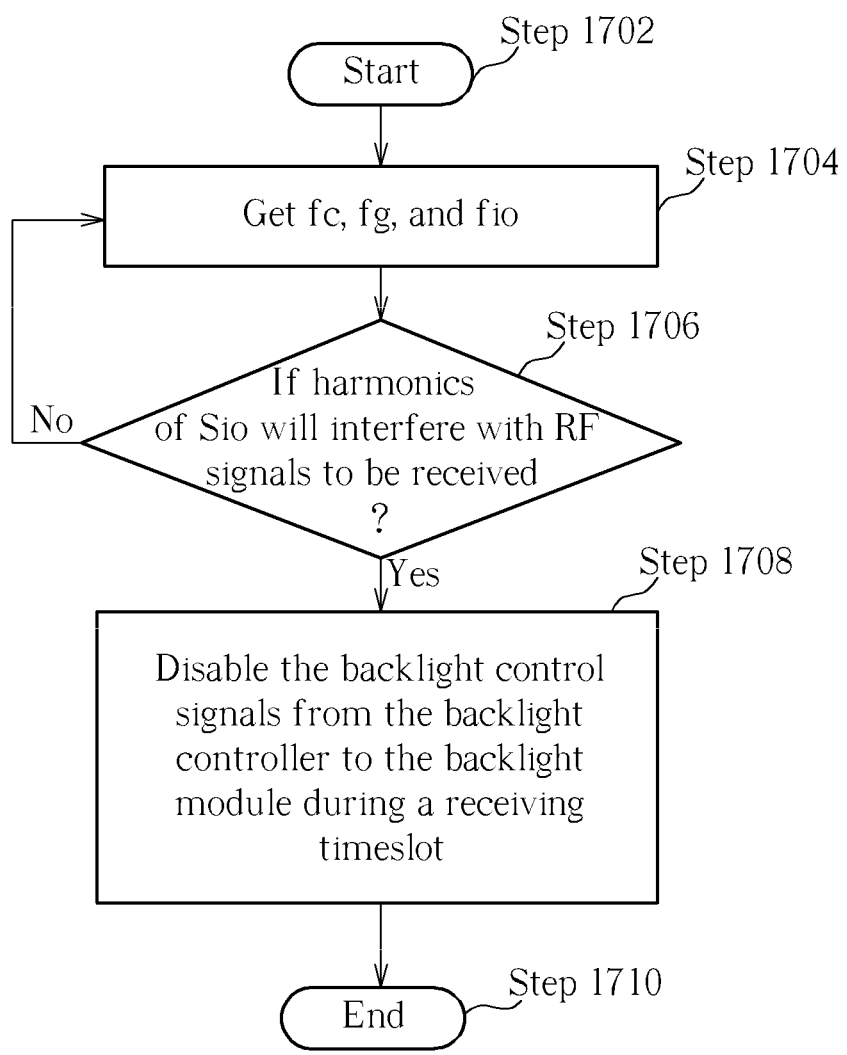
FIG. 17 is an exemplary embodiment of the flow chart of a control method for preventing the RF channel in the RF receiver module in FIG. 15 from being interfered with by the backlight control signals.

The electronic device 1500 may apply methods to selectively disable the control from the backlight controller 1550 to the backlight module 1560. Please refer to FIG. 17 in conjunction with FIG. 15. FIG. 17 is an exemplary embodiment of the flow chart of a control method for preventing the RF channel in the RF receiver module in FIG. 15 from being interfered with by the backlight control signals. Please note that if the result is substantially the same, the steps are not limited to be executed according to the exact order shown in FIG. 17. The flow, executed by the processing unit 1540, includes the following steps:

Step 1702: Start.

Step 1704: The processing unit 1540 gets information of three parameters fc, fg, and fio wherein fc represents the frequency of a RF channel to be used for the incoming RF signals to be received by the corresponding RF receiver module (the non-baseband module 1510); fg represents a guard band for receiving the incoming RF signals, and fio represent a frequency of a backlight control signal Sio from the backlight controller 1550 to the backlight module 1560. For example, the parameters fc, fg may be obtained from the baseband module 1520, while the parameter fio may be obtained via the message Rfio provided by the backlight controller 1550.

Step 1706: The processing unit 1540 determines whether the harmonics of the backlight control signals Sio will interfere with the RF channel to be used in the RF receiver module (the non-baseband module 1510) or not. If yes, the flow goes to Step 1708; otherwise, the flow goes to Step 1704.

Step 1708: The processing unit 1540 disables the backlight control signals Sio from the backlight controller 1550 to the backlight module 1560 during a timeslot for receiving the incoming RF signals.

Step 1710: End.

The aforementioned method provides a process for avoiding the unwanted RF de-sensitization, as shown in FIG. 17. For example, the process may disable the backlight controller 1550 by lowering or raising a control signal Ssel to a level during a particular receiving timeslot 1820 of a TDMA frame 1815, in which the incoming RF signals will be interfered with by a harmonic of the backlight control signals. The backlight controller 1550 may regularly report the frequency fio of the backlight control signal Sio via a message Rfio (FIG. 16), or report that to the processing unit 1540 when needed. The processing unit 1540 may obtain the frequency of the corresponding RF channel fc with a guard band fg from the first baseband module 1520, as discussed above. Based on the information of the frequency fio of the backlight control signal Sio, the corresponding RF channel frequency fc and the guard band fg, the process may repeatedly apply the equation as described in FIG. 5 or FIG. 6 to determine whether harmonics of backlight control signal Sio will interfere with the RF channel to be used for receiving incoming RF signals or not. If so, the processing unit 1540 will disable the backlight controller 1550 during a receiving timeslot 1820 of the designated TDMA timeslot 1815 (FIG. 18) by utilizing the control signal Ssel. The control outcome can be seen by referring to FIG. 18.

Figure 18:
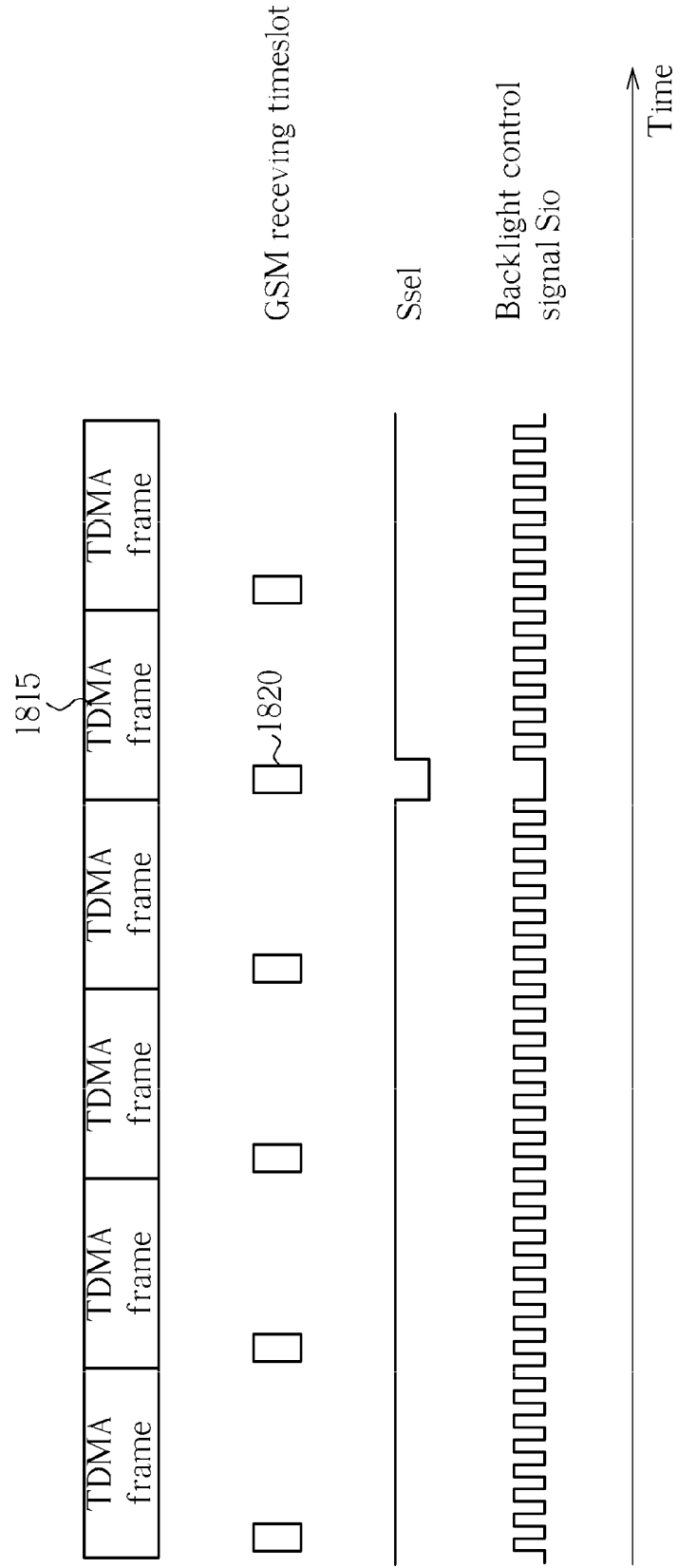
FIG. 18 is a diagram illustrating another exemplary embodiment of a control to avoid the RF de-sensitization by disabling the backlight control when the harmonics of the backlight control signal will interfere with the RF channel to be received.

Please refer to FIG. 18 in conjunction with FIG. 15 and FIG. 17. FIG. 18 is a diagram illustrating another exemplary embodiment of a control to avoid the RF de-sensitization by disabling the backlight control when the harmonics of the backlight control signal Sio will interfere with the RF channel to be received. Similarly, the processing unit 1540 may output a control signal Ssel to the backlight controller 1550 for disabling the control operations. For example, the processing unit 1540 may control the backlight controller 1550 to stop transmitting signals (e.g., the backlight control signals Sio) to the backlight module 1560, thereby preventing the receiving signals during the receiving timeslot 1820 of the particular TDMA frame 1815 from being interfered with by the harmonics of the signals (e.g., the backlight control signal Sio). Those skilled in the art may apply the disclosed methods for delaying data transceiving or control via an IO interface to another peripheral device, such as an external flash memory, a flash card reader or others, without departing from the spirit of the invention. All the alternative designs fall within the scope the present invention.

Figure 19:
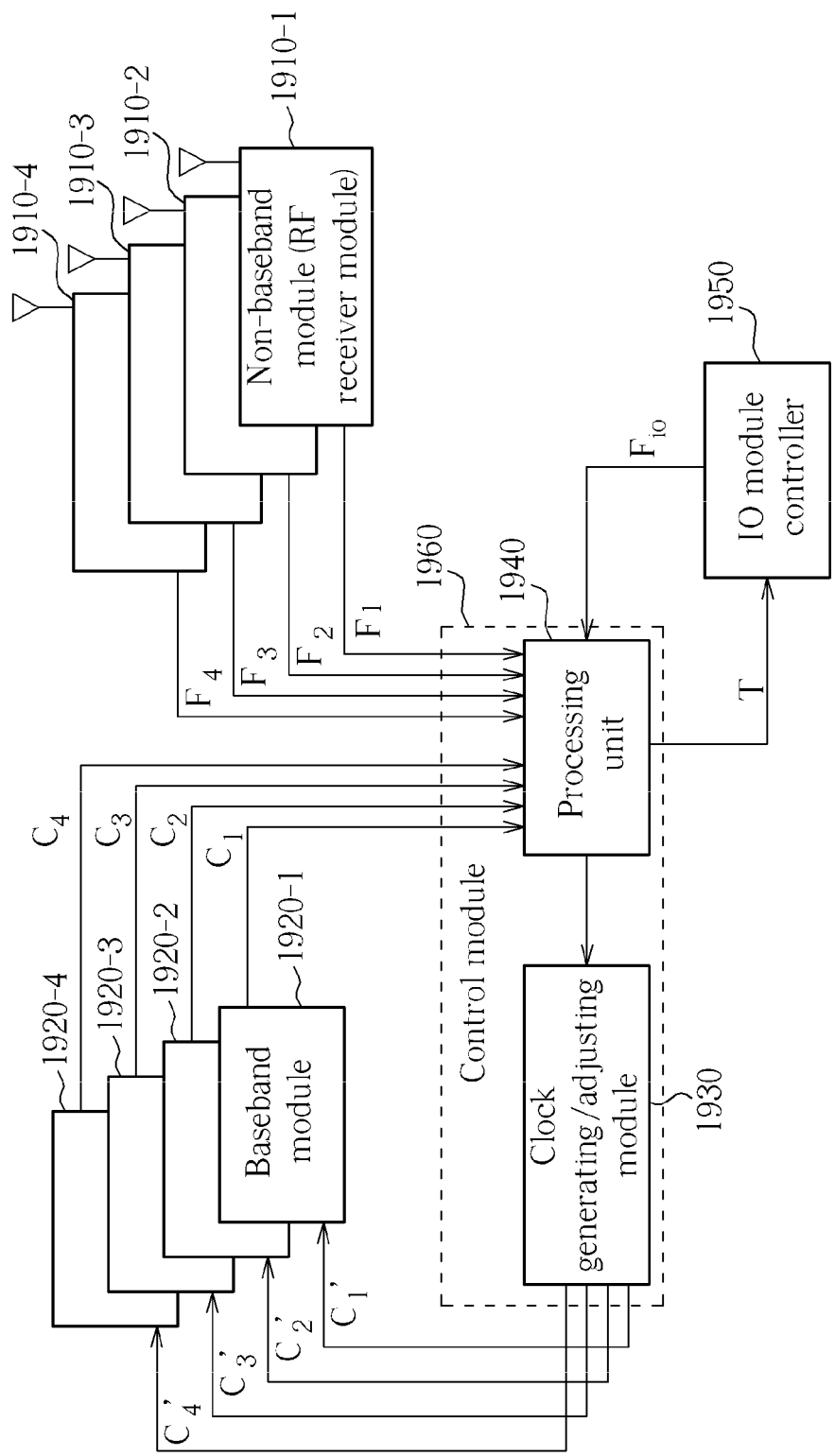
FIG. 19 is a block diagram illustrating a further embodiment of the present invention.

In conclusion, a main spirit of the present invention is to diminish the RF de-sensitization of the RF channel to be used by adjusting the system clock frequency, or selectively disabling the IO module controller (e.g., the backlight controller 1550). That is, by preventing the signals to be received at the corresponding RF channel from being interfered with by the harmonics of the system clocks, the present invention provides a frequency-domain solution for ensuring RF sensitivity. Moreover, by referring to the receiving timing of the corresponding TDMA (Time division multiple access) system to enable/disable the controlling from the IO module controller (e.g., the backlight controller 1550) to the corresponding IO module (e.g., the backlight module 1560), the present invention also provides a method/apparatus with ensured RF sensitivity by time-domain control. Please refer to FIG. 19. FIG. 19 is a block diagram illustrating a further embodiment of the present invention. For example, the electronic device 1900 includes a plurality of receiver modules, such as the non-baseband modules (e.g., RF receiver modules) 1910-1~1910-4, a plurality of baseband modules, such as baseband modules 1920-1~1920-4, a control module 1960 including a clock generating/adjusting module 1930 and a processing unit 1940, and an IO module controller 1950 for controlling a corresponding IO module (not shown), wherein as mentioned above. The IO module may be a backlight module when the corresponding IO module controller 1950 is a backlight controller. Since the details of the operations and structures of the non-baseband modules (e.g., RF receiver modules), the baseband modules, the clock generating/adjusting module, the processing unit, and the IO module controller have been disclosed above, further descriptions are omitted here for the sake of brevity. In short, the present invention provides methods and corresponding apparatus, where frequency characteristics of the current system clocks required by the baseband modules 1920-1~1920-4 can be presented as C1, C2, C3 and C4 respectively. According to the control of the processing unit 1940, the system clocks to each of the baseband modules 1920-1~1 920-4 may be adjusted by the clock generating/adjusting module 1930, according to the information corresponding to frequency characteristics of the current system clocks C1~C4 and information corresponding to frequency characteristics of the receiving channels of the non-baseband modules (e.g., RF receiver modules) of different wireless communications systems. That is, each of the non-baseband modules (e.g., RF receiver modules) 1910-1~1910-4 may comply with a wireless standard different from others, according to the design requirements. In addition, the time delay to transmit control signal of the IO modules (e.g., a backlight module) can also be controlled in terms of frequency/harmonics of the control signal and the receiving channels of the RF modules of different wireless communications systems. In FIG. 19, for example, the corresponding parameters can be presented as follows:

$$C_1' = \text{fun}C_1(C_1, C_2, \ldots, C_n, F_1, F_2, \ldots, F_n) \quad (1)$$

$$C_2' = \text{fun}C_2(C_1, C_2, \ldots, C_n, F_1, F_2, \ldots, F_n) \quad (2)$$

$$C_n' = \text{fun}C_n(C_1, C_2, \ldots, C_n, F_1, F_2, \ldots, F_n) \quad (3)$$

$$T = \text{fun}C_{IO}(F_{IO}, F_1, F_2, \ldots F_n) \quad (4)$$

where $F_X$: receiving frequency of the RF module corresponding to the wireless communications system X;

$C_X$: current baseband clock frequency (may interchangeably refer to as baseband clock rate) of the baseband module X;

$C'_X$: adjusted baseband clock frequency (may interchangeably refer to as baseband clock rate) of the baseband module X;

$F_{IO}$: frequency of the IO control signal to the IO module;

T: calculated time delay to transmit IO control signals to the IO module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting a system clock in terms of an operational status of at least one non-baseband module, comprising:
    getting first information corresponding to the system clock of at least one baseband module, wherein the first information comprises a frequency characteristic of the system clock;
    getting second information corresponding to the at least one non-baseband module, wherein the second information comprises a frequency characteristic of a radio frequency (RF) signal to be received by the non-baseband module, wherein the second information further comprises a first frequency of a first signal and a second frequency of a second signal, the first signal and the second signal corresponds to the RF signal to be received; and
    selectively adjusting a frequency of the system clock by referring to the first information and the second information, comprising:
        inspecting whether the RF signal to be received is interfered with by a harmonic of the system clock by referring to the first information and the second information, and generating an inspection result accordingly, comprising:
            determining priorities of the first signal and the second signal;
            determining a first candidate system clock frequency and a second candidate system clock frequency for the system clock;
            inspecting whether the first and second signals will be interfered with by a first harmonic of the system clock at the first candidate system clock frequency respectively; and
            inspecting whether the first and second signals will be interfered with by a second harmonic of the system clock at the second candidate system clock frequency respectively, and
        selectively adjusting the frequency of the system clock by referring to the inspection result, comprising:
            when the inspection result shows that the first signal will be less interfered with by the first harmonic of the system clock at the first candidate system clock frequency than by the second harmonic of the system clock at the second candidate system clock frequency, and the first signal has a higher priority than that of the second signal, adjusting the frequency of the system clock to the first candidate system clock frequency.

2. The method of claim 1, wherein the at least one non-baseband module comprises a RF receiver module, and the frequency characteristic of the RF signal to be received comprises a channel frequency; the frequency characteristic of the system clock comprises a clock frequency; and the second information further comprises a guard band corresponding to the RF signal.

3. The method of claim 1, wherein the second frequency is higher than the first frequency.

4. The method of claim 3, wherein the first signal is the RF signal to be received via an RF channel, and the second signal is generated by a local oscillator.

5. The method of claim 1, wherein the second information further comprises a first RF signal at a first frequency to be received by a first non-baseband module, and a second RF signal at a second frequency to be received by a second non-baseband module, and the first and second non-baseband modules comply with different wireless communications standards, respectively, the step of inspecting whether the RF signal to be received is interfered with by the harmonic of the system clock, further comprises:
    determining priorities of the first RF signal and the second RF signal;
    determining a first candidate system clock frequency and a second candidate system clock frequency for the system clock;
    inspecting whether the first and second RF signals will be interfered with by a first harmonic of the system clock at the first candidate system clock frequency respectively; and
    inspecting whether the first and second signals will be interfered with by a second harmonic of the system clock at the second candidate system clock frequency respectively, and
    wherein the step of selectively adjusting the frequency of the system clock by referring to the inspection result comprises:
        when the inspection result shows that the first signal will be less interfered with by the first harmonic of the system clock at the first candidate system clock frequency than by the second harmonic of the system clock at the second candidate system clock frequency, and the first signal has a higher priority than that of the second signal, adjusting the frequency of the system clock to the first candidate system clock frequency.

6. The method of claim 5, wherein the first signal corresponds to a channel complying with a Global System for Mobile Communications (GSM) standard, the second signal corresponds to a channel complying with a wireless communications standard different from the GSM standard.

7. An electronic device for adjusting a system clock in terms of an operational status of at least one non-baseband module, comprising:
- at least one baseband module, for receiving a system clock;
- at least one non-baseband module; and
- a control module, for getting first information corresponding to the system clock, getting second information corresponding to the at least one non-baseband module, and selectively adjusting a frequency of the system clock by referring to the first information and the second information, wherein the second information further comprises a first frequency of a first signal and a second frequency of a second signal, the first signal and the second signal corresponds to the RF signal to be received;
- wherein the first information comprises a frequency characteristic of the system clock, and the second information comprises a frequency characteristic of an radio frequency (RF) signal to be received by the non-baseband module; the control module includes a clock generating/adjusting module and a processing unit; the processing unit inspects whether the RF signal to be received is interfered with by a harmonic of the system clock by referring to the first information and the second information, generates an inspection result accordingly, and selectively controls the clock generating/adjusting module to adjust the frequency of the system clock by referring to the inspection result; the processing unit further determines priorities of the first signal and the second signal, determines a first candidate system clock frequency and a second candidate system clock frequency, inspects whether the first and second signals will be interfered with by a first harmonic of the system clock at the first candidate system clock frequency respectively, inspects whether the first and second signals will be interfered with by a second harmonic of the system clock at the second candidate system clock frequency respectively, when the inspection result shows that the first signal will be less interfered with by the first harmonic of the system clock at the first candidate system clock frequency than by the second harmonic of the system clock at the second candidate system clock frequency, and the first signal has a higher priority than that of the second signal, the processing unit controls the clock generating/adjusting module adjust the frequency of the system clock to the first candidate system clock frequency.

8. The electronic device of claim 7, wherein the at least one non-baseband module comprises a RF receiver module, and the frequency characteristic of the RF signal to be received comprises a channel frequency; the frequency characteristic of the system clock comprises a clock frequency; and the second information further comprises a guard band corresponding to the RF signal.

9. The electronic device of claim 7, wherein the second frequency is higher than the first frequency.

10. The electronic of claim 9, wherein the first signal is the RF signal to be received via an RF channel, and the second signal is generated by a local oscillator.

11. The electronic device of claim 7, wherein the electronic device comprises a first non-baseband module and a second non-baseband module, the second information further comprises a first RF signal at a first frequency to be received by a first non-baseband module, and a second RF signal at a second frequency to be received by a second non-baseband module, and the first and second non-baseband modules comply with different wireless communications standards, respectively, and the processing unit further determines priorities of the first RF signal and the second RF signal, determines a first candidate system clock frequency and a second candidate system clock frequency for the system clock, inspects whether the first and second RF signals will be interfered with by a first harmonic of the system clock at the first candidate system clock frequency respectively, inspects whether the first and second signals will be interfered with by a second harmonic of the system clock at the second candidate system clock frequency respectively, and wherein, when the inspection result shows that the first signal will be less interfered with by the first harmonic of the system clock at the first candidate system clock frequency than by the second harmonic of the system clock at the second candidate system clock frequency, and the first signal has a higher priority than that of the second signal, the processing unit controls the clock generating/adjusting module to adjust the frequency of the system clock to the first candidate system clock frequency.

12. The electronic device of claim 11, wherein the first signal corresponds to a channel complying with a Global System for Mobile Communications (GSM) standard, the second signal corresponds to a channel complying with a wireless communications standard different from the GSM standard.

13. The electronic device of claim 7, wherein the at least one baseband module, the at least one non-baseband module, and the control module are integrated into a chip (System on Chip, SOC).

* * * * *